(12) United States Patent
Saika

(10) Patent No.: US 7,055,053 B2
(45) Date of Patent: May 30, 2006

(54) SYSTEM AND METHOD FOR FAILOVER

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/876,295

(22) Filed: Jun. 23, 2004

(65) Prior Publication Data
US 2005/0204183 A1 Sep. 15, 2005

(30) Foreign Application Priority Data
Mar. 12, 2004 (JP) ............................. 2004-070057

(51) Int. Cl.
G06F 11/00 (2006.01)

(52) U.S. Cl. ............................................ 714/4; 714/10
(58) Field of Classification Search .................. 714/4, 714/10
See application file for complete search history.

(56) References Cited

U.S. PATENT DOCUMENTS 6,247,139 B1 6/2001 Walker et al.
6,748,550 B1 6/2004 McBrearty et al.
2003/0018927 A1 1/2003 Gadir et al.
2003/0051187 A1* 3/2003 Mashayekhi et al. .......... 714/4

FOREIGN PATENT DOCUMENTS

JP 11-353292 12/1999

* cited by examiner

Primary Examiner—Robert Beausoliel
Assistant Examiner—Michael Maskulinski
(74) Attorney, Agent, or Firm—Townsend and Townsend and Crew LLP

(57) ABSTRACT

A node 1 and a node 2 are in a mutual failover relationship and share information used in failover through a shared LU. Of filesystems FS1A, FS1B that are mounted at the node 1, the actions of level 1 are allocated to FS1A and the actions of level 2 are allocated to FS1B. The level 1 filesystem FS1A is taken over to the node 2 simultaneously with commencement of failover. The level 2 filesystem FS1B is taken over to the node 2 when an access request for FS1B is generated after commencement of failover. In this way, business services with high availability can be restarted at an early stage.

5 Claims, 16 Drawing Sheets

FIG.3A

T1 — CATEGORY DETERMINATION TABLE

INCREASING ACCESS FREQUENCY →

INCREASING NUMBER OF SHARED HOSTS ↓

| CATEGORY DETERMINATION TABLE | ACCESS FREQUENCY L | |
|---|---|---|
| NUMBER OF SHARED HOSTS H | $L \leq m$ | $m < L$ |
| H=1 | CATEGORY 32 | CATEGORY 31 |
| $2 \leq H < n$ | CATEGORY 22 | CATEGORY 21 |
| $n \leq H$ | CATEGORY 12 | CATEGORY 11 |

FIG.3B

| FAILOVER ACTION DEFINITION TABLE | | | ~T2 |
|---|---|---|---|
| LEVEL | ACTION | RELEVANT CATEGORY | |
| LEVEL1 | MOUNT ON FAILOVER | CATEGORY11 | |
| LEVEL2 | MOUNT ON DEMAND AFTER FAILOVER | CATEGORY31 CATEGORY22 CATEGORY21 CATEGORY12 | |
| LEVEL3 | DO NOT MOUNT ON FAILOVER BUT MOUNT AFTER FAILBACK | CATEGORY11 | |

FIG.3C

FILESYSTEM ACTION ALLOCATION LIST

| FILESYSTEM NAME | OPERATING LEVEL |
|---|---|
| FS1A | LEVEL 1 |
| FS1B | LEVEL 2 |
| FS1C | LEVEL 3 |
| ⋮ | ⋮ |

| FILESYSTEM-SHARED HOST NUMBER INFORMATION (FS-H INFORMATION) | |
|---|---|
| FILESYSTEM NAME | NUMBER OF SHARED HOSTS |
| FS1A | 20 |
| FS1B | 7 |
| FS1C | 1 |
| ⋮ | ⋮ |

| FILESYSTEM-ACCESS FREQUENCY INFORMATION (FS-L INFORMATION) | |
|---|---|
| FILESYSTEM NAME | ACCESS FREQUENCY |
| FS1A | 200 |
| FS1B | 105 |
| FS1C | 1 |
| ⋮ | ⋮ |

| ACCESS LOG | |
|---|---|
| ACCESS TIME | FILESYSTEM NAME |
| 20040126120000 | FS1A |
| 20040126120105 | FS1B |
| 20040126120326 | FS1A |
| ⋮ | ⋮ |

~T6

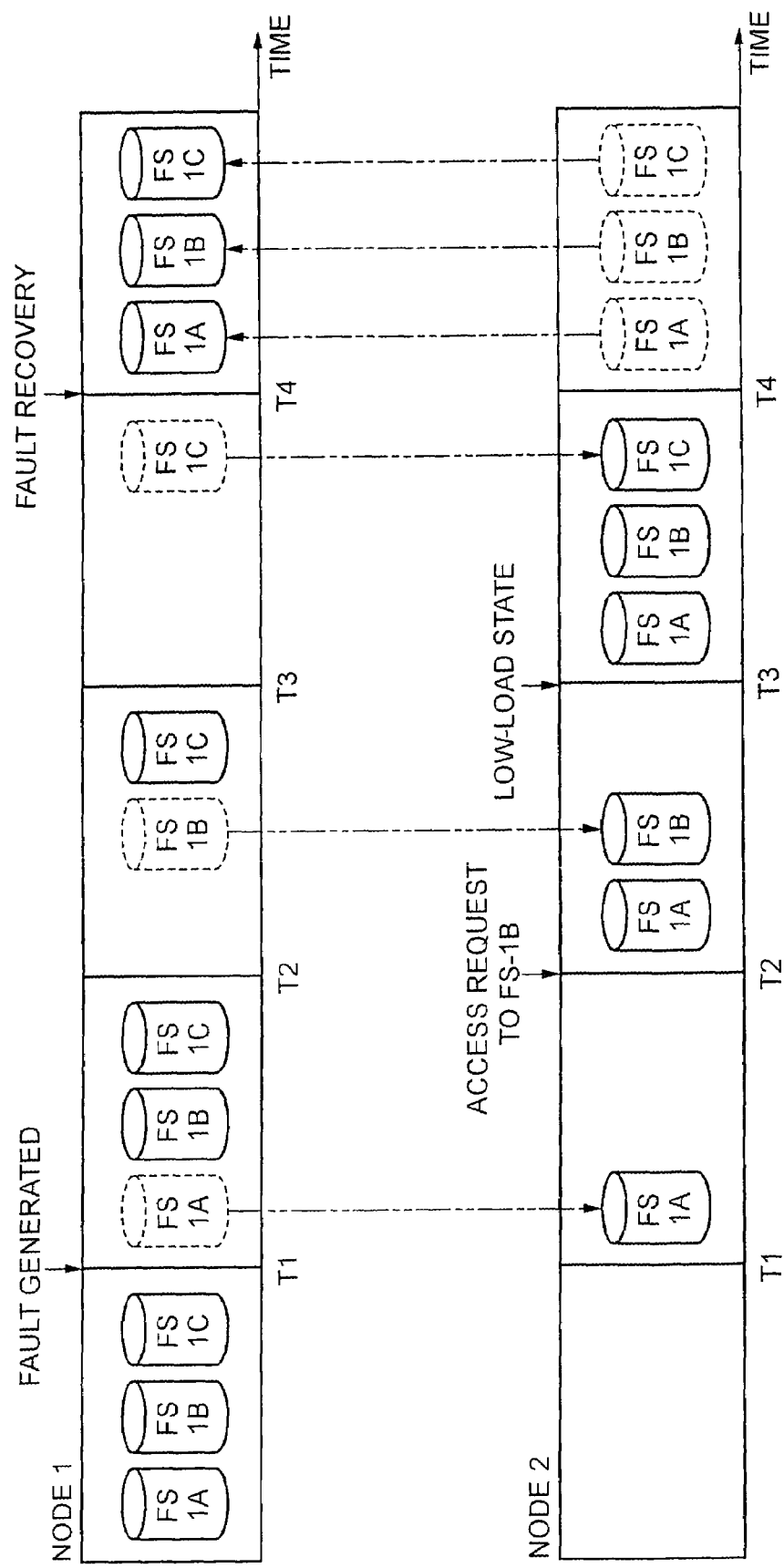

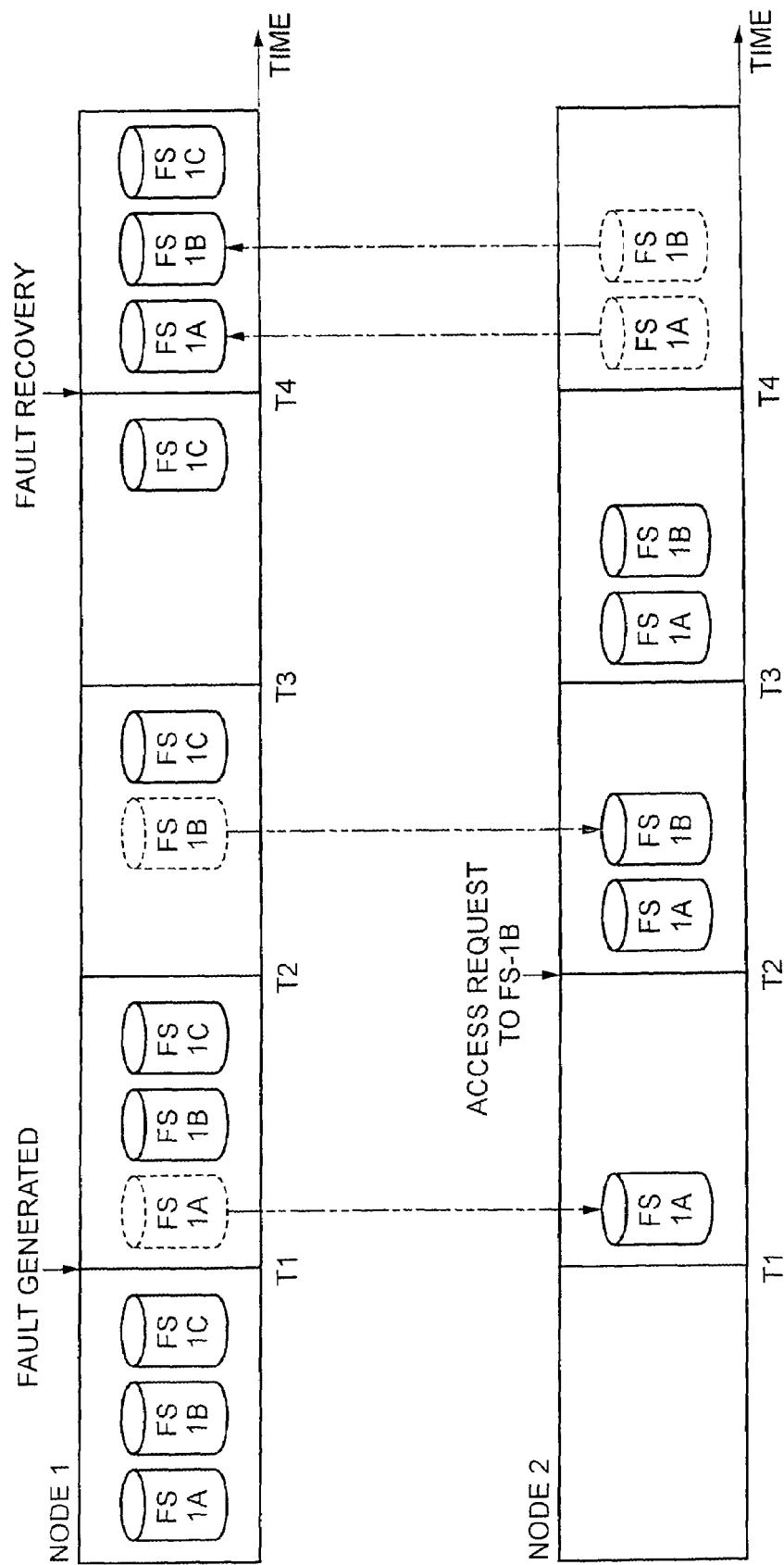

SYSTEM AND METHOD FOR FAILOVER

CROSS-REFERENCE TO RELATED APPLICATIONS

This application relates to and claims priority from Japanese Patent Application No. 2004-70057 filed on Mar. 12, 2004, the entire disclosure of which is incorporated herein by reference.

BACKGROUND OF THE INVENTION

1. Field of the Invention

The present invention relates to a system and method for failover.

2. Description of the Related Art

In a cluster system, a plurality of computers (also called nodes) are loosely coupled to constitute a single cluster. Known types of cluster systems include for example load distributed systems and failover systems. In a failover cluster system, the system is provided with redundancy by using a plurality of computers. In the failover system, continuity of the business application service in regard to client computers is ensured by arranging that when one computer stops, its task is taken over by another computer. The one computer and the other computer are connected using a communication circuit (interconnection) such as a LAN and stoppage of a remote computer is monitored by "heartbeat" communication exchanged therewith.

Heartbeat communication is a technique of mutually monitoring for cessation of function by communication of prescribed signals at prescribed intervals between a plurality of computers. While heartbeat communication is being performed, the remote computer is deemed to be operating normally and failover (takeover of business services) is not performed. Contrariwise, if heartbeat communication is interrupted, it is concluded that the system of the remote computer is down and the business application services that were provided by the remote computer are taken over by the failover target computer.

From the point of view of the client computer that is using the business application service, the entire failover cluster appears as a single computer. The client computer is therefore not aware of which computer the business application service is being provided by even when processing is changed over from the live computer to the standby computer.

However, if failover is executed without giving any consideration to the operating condition of the failover target computer, the computer that takes over the business application service may itself become overloaded, resulting for example in a drop in response. In this connection, a technique is known whereby it may be arranged for the priority of the business application service to be altered in accordance with the operating condition of the failover target computer (Japanese Patent Application Laid-open No. H. 11-353292).

In the technique disclosed in this reference, transfer from the failover source to the failover target is arranged to be performed after first conducting an overall estimate of the total resources of the failover objects. The time taken to restart the business application service at the failover target computer therefore increases as the resources of the failover objects increase.

For example, when taking over a failover system, it is necessary to unmount the failing system at the failover source and to mount the failing system at the failover target. When performing unmounting or mounting, it is necessary to maintain the consistency of the data set by for example reflecting the data on the cache to the disk and reproducing the memory condition of the data in accordance with the update history file. The time required before the business application service can be restarted therefore increases as the number of filesystems to be transferred from the failover source to the failover target increases.

SUMMARY OF THE INVENTION

In view of the above, an object of the present invention is to provide a failover cluster system and a failover method whereby the time required until restarting provision of the business service can be reduced. An object of the present invention is to provide a failover cluster system and a failover method whereby the time required until restarting provision of the business service can be reduced without loss of convenience, by arranging to transfer resources of higher frequency of use first, and to transfer resources of lower frequency of use later. An object of the present invention is to provide a failover cluster system and a failover method whereby failover can be performed efficiently by dynamically altering the ranking of takeover processing in accordance with the state of use of the resources. Further objects of the present invention will become clear from the following description of embodiments.

In order to solve the above problems, in a failover cluster system according to the present invention, a plurality of computers are connected and, in a prescribed case, failover object resources of a failover source computer are taken over by a failover target computer and there is provided a control section that is capable of taking over failover object resources in stepwise fashion.

One example of failover object resources is a filesystem. The control section is capable of taking over a failover object resource in stepwise fashion in accordance with a priority ranking set for the failover object resource. Stepwise takeover of a resource means performing takeover processing in units of each resource such that for example a given filesystem is moved first and another filesystem is moved afterwards.

The control section may set up a priority ranking beforehand for the failover object resources, based on the state of use of the failover object resources.

Also, the computers may employ a shared memory device to share takeover information relating to takeover of failover object resources. The failover object resources can then be taken over in stepwise fashion in accordance with the priority ranking, by referring to the takeover information of the shared memory device.

The takeover information can be constituted by associating information for specifying failover object resources with takeover processing actions set for the failover object resources in accordance with the priority ranking.

Also, the priority ranking may include a first ranking whereby takeover processing is immediately executed and a second ranking whereby takeover processing is executed when an access request for a failover object resource is generated.

Furthermore, the priority ranking may further include a third ranking in accordance with which takeover processing of a failover object resource is executed if the failover target computer is in a prescribed low-load condition.

In addition, the priority ranking may further include a fourth ranking in accordance with which takeover processing is not executed.

BRIEF DESCRIPTION OF THE DRAWINGS

FIG. 3 shows the constitution of various tables, (a) being a category determination table, (b) being a failover action definition table and (c) being a filesystem action allocation list, respectively;

FIG. 7 shows the constitution of various types of information, (a) being information associating a shared host number with each filesystem, (b) being information associating access frequency with each filesystem and (c) being an access log, respectively;

FIG. 12 is a diagram showing schematically an example of failback;

FIG. 13 is a diagram showing schematically a further example of failback;

DESCRIPTION OF THE PREFERRED EMBODIMENTS

Embodiments of the present invention are described below with reference to FIG. 1 to FIG. 16.

Figure 1A:
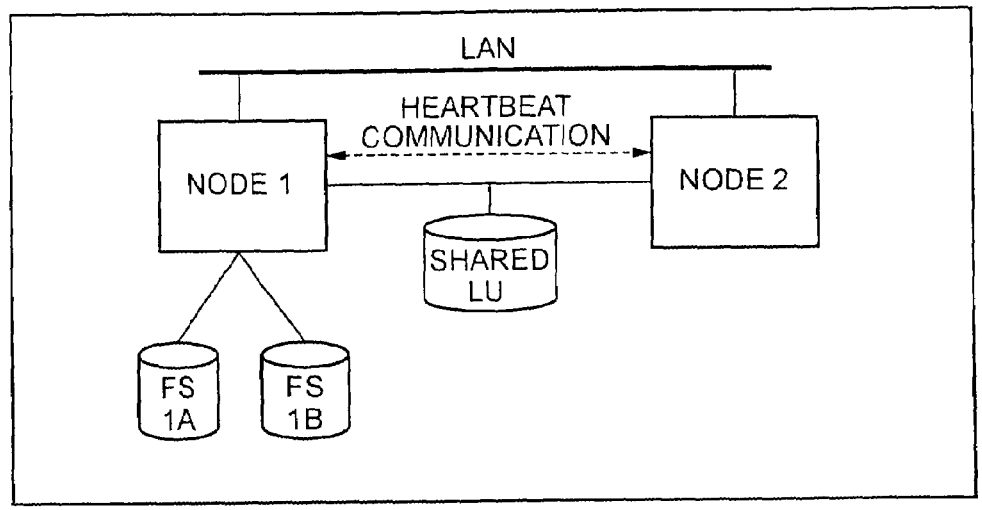
FIG. 1 is a diagram showing an outline of the present invention.

In a failover system according to the present invention, for example as shown in the diagram of the invention of FIG. 1(a), the nodes 1, 2 mutually constitute failover objects and are mutually monitored by performing heartbeat communication. The nodes 1, 2 share various types of information used in failover, by means of a shared LU (logical unit). Each of the nodes 1, 2 is capable of using a respective filesystem and is capable of providing a respective business application service. However, in FIG. 1, for convenience, only the filesystems FS1A, FS1B of the node 1 are shown.

Figure 1B:
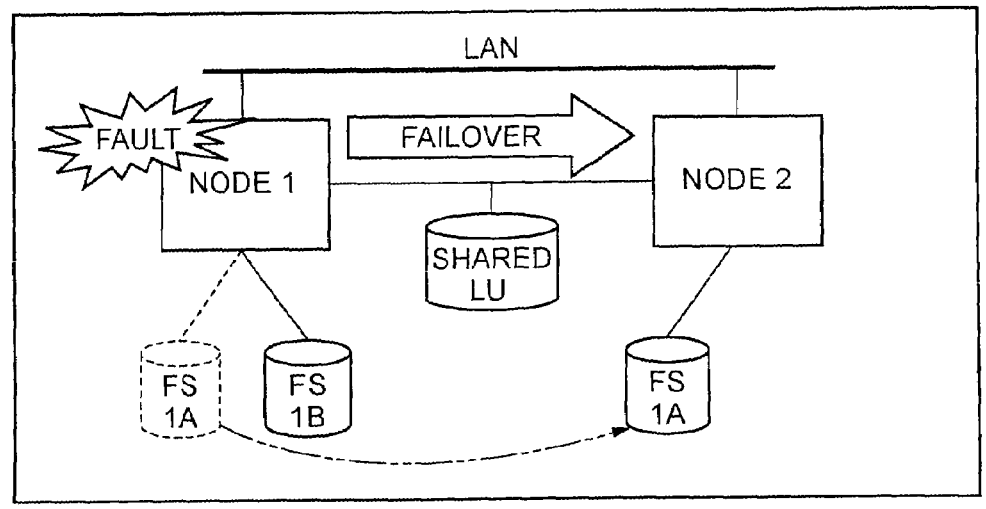
Figure 1C:
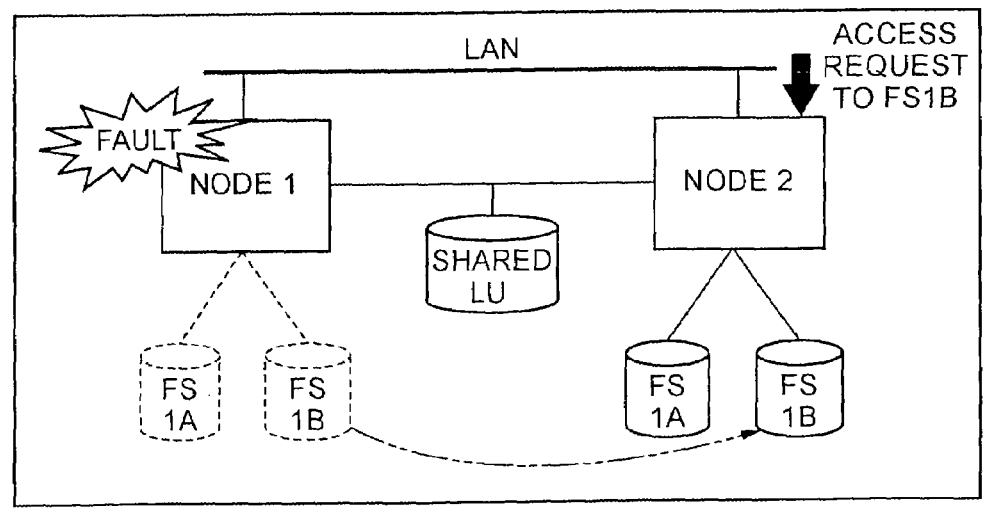
Figure 2:
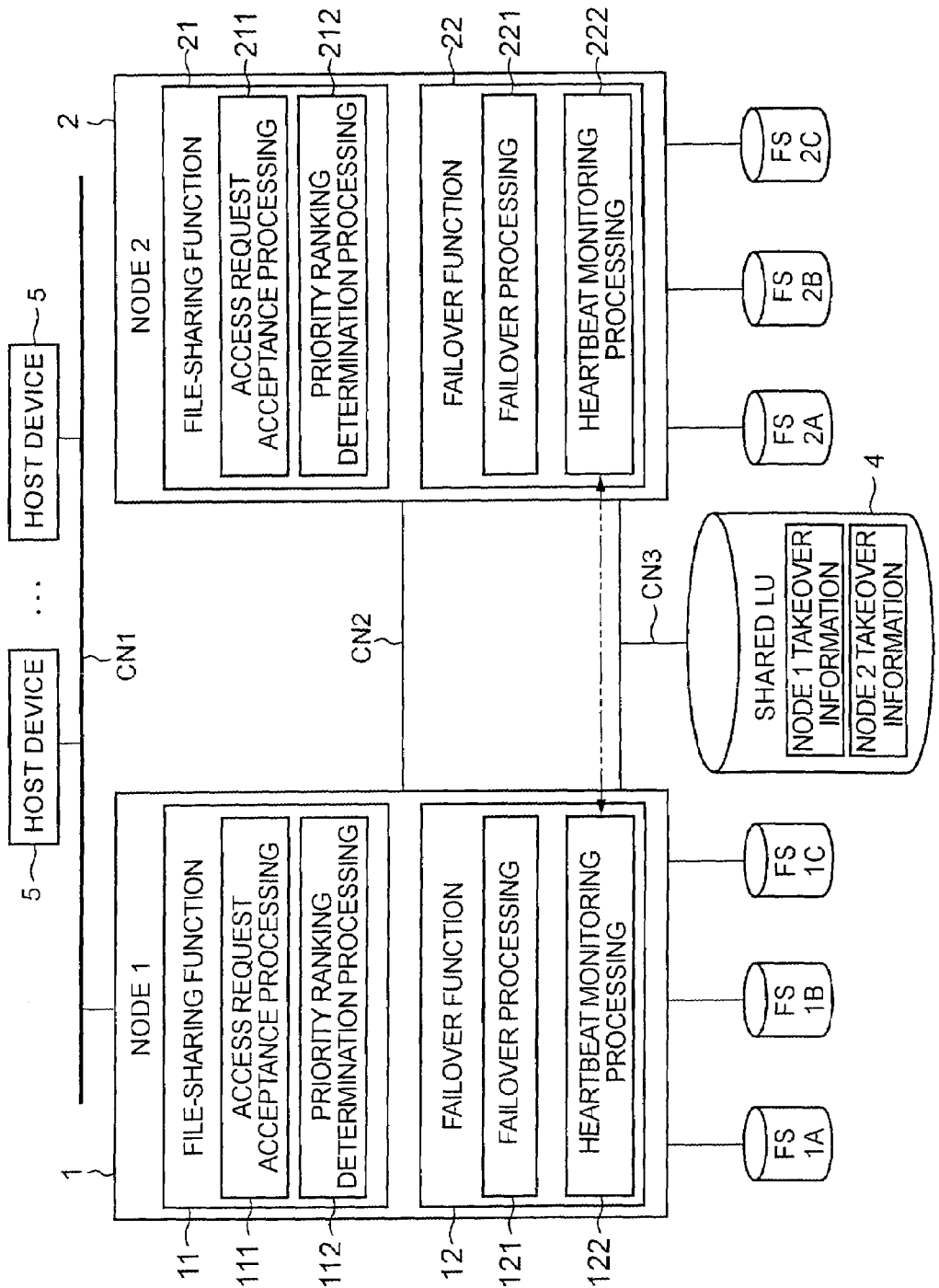
FIG. 2 is a functional block diagram showing the overall layout of the failover system according to an embodiment of the present invention.

As shown in FIG. 1(b), if a fault of some kind occurs at a given time-point, as a result of which 1 the system of the node 1 is down, heartbeat communication between the nodes 1 and 2 is interrupted. On detecting that the system of the node 1 is down from the interruption of the heartbeat communication, the node 2 executes failover. A plurality of filesystems FS1A, FS1B are mounted at the node 1. It will be assumed that this plurality of filesystems FS1A, FS1B constitute the failover objects. In this embodiment, stepwise transfer is enabled in accordance with the state of use of the filesystems, instead of transferring the filesystems to the failover target node 2 as a result of a single overall evaluation of all of the filesystems FS1A, FS1B. That is, first of all, at the start of failover, FS1A, whose priority ranking is set to be high, is immediately mounted at the node 1. Then, as shown in FIG. 1(c), FS1B, whose priority ranking is set to be low, is mounted at the node 2, after waiting for generation of an access request to this FS1B.

In this way, in this embodiment, the filesystems FS1A, FS1B constituting the failover objects, are transferred in stepwise fashion to the failover target node 2 from the failover source node 1 in accordance with the state of use of the filesystems. Since this state of use of the filesystems may vary in various ways, the degree of priority that specifies the order in which transfer is to be performed is altered dynamically. In this embodiment, the resource FS1A, which is of a higher degree of priority, is transferred immediately, and the resource FS1B, which is of a low degree of priority, is transferred when required. Consequently, the business application services using FS1A which are of high frequency of use can rapidly be restarted, improving convenience of use for the user. Although details will be described later, various modified examples exist regarding the method of resource categorization and the details of the takeover operation.

This embodiment discloses a method of failover of a failover system constituted by connecting a plurality of computers between which a mutual failover relationship has been established. This method comprises: a step of monitoring the state of use of a failover object resource; a step of setting a priority ranking of the failover object resource in accordance with the state of use; a step of storing on a shared disk shared by each computer takeover information constituted by associating information for specifying the failover object resource with a takeover processing action set for the failover object resource in accordance with the priority ranking; a step of determining whether or not a failover execution condition has been established; and a step of, if it is determined that the failover execution condition has been established, taking over the failover object resource of a failover source computer in stepwise fashion onto a failover target computer in accordance with the priority ranking, by referring to the takeover information stored on the shared disk.

In more detail, a failover system according to this embodiment comprises a failover source computer, a failover target computer connected with this failover source computer and a shared disk shared by the failover source computer and the failover target computer. Also, in the failover source computer, there is provided a priority ranking determination processing section that classifies the filesystems constituting the failover objects into one of a first category, second category or third category in accordance with the state of use of these respective filesystems and that stores in the shared disk the correspondence relationship of these respective filesystems and respective categories and, in the failover target computer, there are provided a failover processing section that executes immediate mounting of filesystems belonging to the first category and an access request acceptance processing section that, if an access request is generated in respect of a filesystem belonging to the second category, executes mounting of the filesystem belonging to the second category but does not execute mounting in respect of a filesystem belonging to the third category irrespective of whether or not there is a request for access.

[Embodiment 1]

FIG. 1 is a functional block diagram showing an outline of an entire failover system according to this embodiment. This failover system comprises a plurality of nodes 1, 2 mutually constituting failover objects, as will be respectively described, and a shared disk 4 that is shared by the nodes 1, 2.

The nodes 1 and 2 are respectively constructed as for example computer systems (server machines) comprising computer resources such as a CPU, memory, and interface circuitry. For example, the nodes 1 and 2 may be respectively constituted as NAS (network attached storage) specialized for a file-sharing service. Or the nodes 1, 2 may be constituted as file servers on which a file-sharing program is installed on an ordinary OS (operating system).

The node 1 and the node 2 are connected with a single or a plurality of host devices 5 through a communication network CN 1 providing respective services. Also, the node 1 and the node 2 are mutually connected through another communication network CN 2. In addition, the node 1 and the node 2 are respectively connected with a shared LU 4 through a communication network CN 3. The communication networks CN 1, CN 2 may be constituted for example by LANs (local area networks). The communication network CN 3 may be constituted for example by a SAN (storage area network). There is no restriction to the above example and various communication networks and protocols may be suitably selected.

The node 1 comprises a file-sharing function 11 and a failover function 12. Also, the node 1 is capable of utilizing a plurality of filesystems FS1A to FS1C. The node 1 provides various types of business application service (hereinbelow referred to as business services) using these filesystems FS1A to FS1C. As will be described, the filesystems FS1A to FS1C constitute the failover object resources and it is possible for their priority rankings to be respectively different.

The file-sharing function 11 comprises access request acceptance processing 111 and priority ranking determination processing 112. Although this will be described in more detail later, the access request acceptance processing 111 performs for example processing of access requests from the host devices 5 and management of access logs. The priority ranking determination processing 112 determines the categories to which the filesystems FS1A to FS1C are affiliated in accordance with for example the state of access from the host devices 5 and sets the priority ranking on failover accordingly.

The failover function 12 comprises failover processing 121 and heartbeat monitoring processing 122. Although this will be described in more detail later, the failover processing 121 is started up in response to a notification from the heartbeat monitoring processing 122 and restarts the business service after taking over the filesystem from the node of the failover source. The heartbeat monitoring processing 122 monitors whether or not heartbeat communication is being periodically executed between the nodes. For example, if heartbeat communication is interrupted for more than a prescribed time, the heartbeat monitoring processing 122 concludes that the system of the remote node 2 is down and starts up the failover processing 121.

Like the node 1, the node 2 also comprises a file-sharing function 21 and failover function 22. The file-sharing function 21 comprises access request acceptance processing 211 and priority ranking determination processing 212. The failover function 22 comprises failover processing 221 and heartbeat monitoring processing 222. Identical functions are respectively realized at the node 2 and the node 1. Also, the node 2 is capable of utilizing a plurality of filesystems FS2A to FS2C. The node 2 provides business services to the host device 5 using the filesystems FS2A to FS2C.

In this embodiment, the node 1 and the node 2 are in a mutually equivalent relationship and are respectively capable of providing business services independently. Thus, if the system of the node 1 goes down or undergoes a planned stoppage, the business service provided by the node 1 is taken over by the node 2. Contrariwise, if the system of the node 2 goes down or undergoes a planned stoppage, the business service provided by the node 2 is taken over by the node 1. It should be noted that there is no restriction to this and if for example the node 1 is employed as a live server, the node 2 could be arranged to be employed as a standby server.

The filesystems FS1A to FS1C and FS2A to FS2C employed at the nodes 1 and 2 are respectively prepared for each type of OS of the host devices 5. Also, even in the case of filesystems employed with the same OS, when used by another user, different filesystems may be presented. Each filesystem is provided for example on a logical volume (LU) A logical volume is constructed for example on a physical storage region such as a hard disk drive or a semiconductor memory device. A logical volume where a filesystem is provided may be provided by a large capacity storage system such as for example a disk array subsystem.

The shared LU 4 is shared with the node 1 and the node 2 and stores the takeover information of the node 1 and the takeover information of the node 2. The takeover information of the node 1 is the information required for the node 2 to take over the business services of the node 1. The takeover information of the node 2 is the information required for the node 1 to take over the business services of the node 2. Further details of the takeover information are given with reference to FIG. 3.

FIG. 3 is a diagram showing details of the takeover information employed during failover. In this embodiment, the filesystems are not all are treated equally on failover; rather, they are classified into a plurality of categories in accordance with for example their state of use.

FIG. 3(*a*) shows a category determination table T1 that is employed for categorizing the various filesystems. The category determination table T1 shown in FIG. 3(*a*) serves to indicate the method of determining the categories to which the respective filesystems belong; it is not essential that it should exist as a table that is utilizable by the computer.

In this embodiment, the respective filesystems are classified into a total of six categories by inspecting two indices. One index is the number H of host devices 5 that share this filesystem. The other index is the frequency L with which this filesystem is accessed.

The number of shared hosts H may be for example classified into three classifications. The first classification is the case where the filesystem in question is utilized by n or more host devices 5. The second classification is the case where this filesystem is utilized by at least 2 but less than n host devices 5 ($2 \leq H < n$). The third classification is the case where this filesystem is utilized by only a single host device 5 ($H=1$). n is the threshold value for classification based on the number H of shared hosts.

The access frequency L may be for example classified into two classifications. The first classification is where the access frequency L to the filesystem is greater than m ($m<L$). The second classification is the case where the access frequency L to the filesystem is no more than m ($L \leq m$). m is the threshold value for classification based on the frequency L of access.

The first threshold value n that is employed in classification of the number H of shared hosts and the second threshold value m that is employed in classification of the access frequency L could be set manually by for example the system administrator or could be set by an automatically performed calculation.

The categories shown in FIG. 3(a) are designated by numerals indicating the respective classification of the number H of shared hosts with numerals indicating the respective classifications of the access frequency L appended. For example, in the case where the number of shared hosts is 1 (H=1) and the access frequency L is less than m (L≦m), the classification of the number of shared hosts is classification 3 and the classification of the access frequency is classification 2, so the category is represented as "category 32". Also, if for example the number H of shared hosts is n or more (n≦H) and the access frequency L is greater than m (m<L), the classification of the number of shared hosts is classification 1 and the classification of the access frequency is classification 1, so this is expressed as "category 11".

The number of host devices 5 utilized for file access and the access frequency to these filesystems tend to increase going from the top left to the bottom right in FIG. 3(a). Filesystems belonging to "category 32" are filesystems whose state of use is the least active and filesystems belonging to "category 11" are filesystems whose state of use is most active. Filesystems belonging to the other categories i.e. "category 12", "category 22", "category 21" and "category 31" are filesystems that are positioned in an intermediate state of use, according to the index of either the number of shared hosts H or the access frequency L.

Accordingly, in this embodiment, as will be described below, the six categories are summarized as three groups and respectively different takeover processing actions (levels) are set for each group. Thus, the categories to which the filesystems belong are dynamically changed in accordance with the latest state of use, so that takeover processing action can be performed in accordance with the latest state of use. It should be noted that there is no restriction to the filesystem category divisions of the above example. For example, the categories could be divided either solely in accordance with the access frequency L or solely in accordance with the number of shared hosts H. Also, rather than using a single threshold value, a plurality of threshold values could be employed so as to achieve a finer division of the categories. Furthermore, the grouping of the respective categories is not restricted to the above example and the categories could be summarized into two groups or four or more groups, for example.

FIG. 3(b) is a diagram showing an example of a failover action definition table T2. In this example, the following three levels are provided as takeover processing actions on failover. According to the first level, when failover is started, the filesystems are mounted at the failover target node. According to the second level, when failover is started, mounting is not performed, but mounting is performed at the failover target node when an access request to this filesystem is generated. According to the third level, even if failover is started, the filesystem is not mounted at the failover target node.

Filesystems belonging to "category 11" are most actively used and are therefore given level 1. Since the state of use of a filesystem belonging to "category 32" is the least active, filesystems belonging to this "category 32" are given level 3. Filesystems belonging to the other category are in an intermediate state of use and are therefore given level 2.

Level 1 is a mode in which a filesystem is mounted from the failover source node simultaneously with starting of failover and is remounted on the failover target node; it may therefore be termed "immediate mounting mode". However, remounting of the filesystem simultaneously with starting of failover means that an immediate attempt at mounting onto the failover target node is made by commencement of failover. Prescribed processing is required for example for maintaining data consistency when unmounting or mounting a filesystem and time is therefore required corresponding to the amount of this prescribed processing.

Level 2 is the mode in which mounting to the failover target node is performed when a request to access the filesystem in question is generated and may for example be termed the "on-demand mounting mode". Essentially, a filesystem belonging to level 2 is transferred from the failover source to the failover target on generation of an access request. However, as will be described, even though no access request has been generated, the filesystem may still be moved to the failover target node if the failover target node is in a prescribed low-load condition. Since this mode is executed after waiting for the failover target node to reach a low-load condition, it may be termed the "delayed mounting mode".

Level 3 is a mode in which even when failover has been started, the filesystem cannot be transferred to the failover target node from the failover source node and even if an access request to the filesystem is generated, the filesystem is not mounted at the failover target node. Level 3 is a mode in which mounting is not performed on failover and, if the failover source node is restored and a failback request is issued, the filesystem is remounted at the failover source node. This may therefore be termed for example the "non-mounting mode".

The failover action definition table T2 shown in FIG. 3(b) may or may not be stored in the shared LU 4.

FIG. 3(c) is a diagram showing an example of a filesystem action allocation list T3. The file action allocation list (hereinbelow abbreviated to action allocation list) T3 specifies takeover processing actions on failover, for each filesystem.

For example, in the illustrated example, the actions of level 1 are allocated to the filesystem FS1A and the actions of level 2 are allocated to the filesystem FS1B. The actions of level 3 are allocated to the filesystem FS1C.

If failover is started on occurrence of a fault at the node 1, the filesystem FS1A to which the actions of level 1 are allocated is immediately transferred from the node 1 to the node 2. Immediately after commencement of failover, the only filesystem that has been transferred from the node 1 to the node 2 is FS1A. Consequently, business services using FS1A can immediately be provided by the node 2 merely by mounting the filesystem FS1A only.

Of the filesystems FS1B, FS1C that remain mounted on the node 1, the filesystem FS1B to which the actions of the level 2 are allocated is transferred from the node 1 to the node 2 if an access request is generated from a host device 5. Commencement of transfer of the filesystem FS1B is therefore delayed by the time from the starting time point of failover until the request to access the filesystem FS1B is generated. However, compared with the case where all of the business services are restarted after transfer all of the filesystems FS1A to FS1C to the node 2, partial restarting of the required business services after transfer only the filesystem FS1B improves the response of the cluster system as a whole.

The filesystem FS1C to which the actions of level 3 have been allocated is not transferred from the node 1 to the node 2 even when failover has started. If a request is made to access the filesystem FS1C by a host device 5, an error is returned to the host device 5. If the node 1 recovers and a failback request is issued from the node 1 to the node 2, the failing system FS1C is remounted at the node 1. In this embodiment, the filesystem FS1C, whose state of use is the least active and which has little need to be transferred to the failback target is left as it is without being transferred on failover. Unnecessary mounting at the node 2 can therefore be eliminated and the business services that utilize the other filesystems FS1A, FS1B can therefore be restarted sooner to that extent. Also, on failback, unmounting processing of the filesystem FS1C does not need to be performed and to this extent failback can be completed more rapidly.

Figure 4:
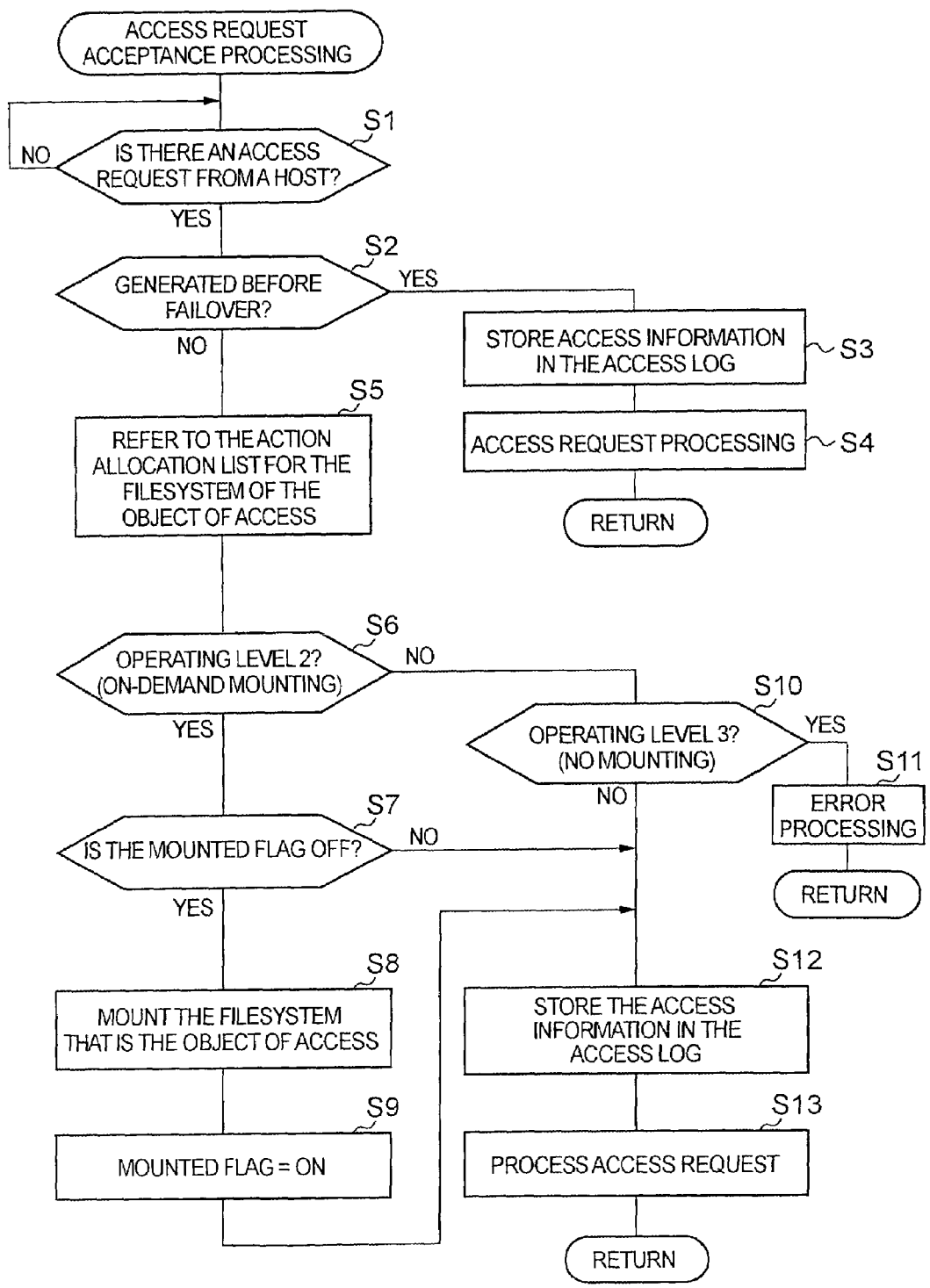
FIG. 4 is a flow chart of access request reception processing.

FIG. 4 is a flow chart showing an outline of the processing that is executed by the access request acceptance processes 111, 211. In the following description, an example is given in which the node 1 is the failover source and the node 2 is the failover target. There is no difference in regard to the content of processing when the node 1 is the failover target and the node 2 is the failover source, so further description of this case may be dispensed with.

The node 2 monitors (S1) whether or not an access request from a host device 5 has been generated. If an access request from a host device 5 is detected (S1: YES), the node 2 identifies (S2). whether or not this request preceded the occurrence of failover. If the access request preceded the occurrence of failover (S2: YES) i.e. in the case of an access request in the normal condition, information relating to this access request is stored in the access log (S3). The access log may be saved in for example a local LU or local memory of the node 2 or may be saved in the shared LU 4. An example of an access log is shown in FIG. 7(c). In this access log T6, the access time (year/month/day/hour/minutes/seconds) and the name of the access filesystem are associated and recorded. The node 2 then performs processing in accordance with the excess request from the host device 5 (S4).

For example, if updating of a file is requested by the host device 5, the new file is received from the host device and written in the prescribed filesystem. Also, if for example reading from a file is requested from a host device 5, the node 2 reads the requested file from the prescribed filesystem and transmits it to the host device 5.

Prior to occurrence of failover, the access request acceptance processes 111, 211 of the nodes 1 and 2 repeat the processing of the respective steps S1 to S4 and respectively update the access logs of access to the filesystems FS1A to FS1C and FS2A to FS2C. The access frequency of each of the filesystems can be respectively found from these access logs.

On the other hand, if there is an access request from a host device 5 after occurrence of failover from the node 1 to the node 2 (S2: NO), the node 2 refers to the action allocation list, specifying the filesystem that is the object of access. The node 2 thereby ascertains (S5) the level of the takeover processing action that is allocated to the filesystem that is the object of access.

Next, the node 2 identifies (S6) whether or not the actions of level 2 are allocated to the filesystem that is the object of access. If the actions of level 2 are allocated to this filesystem (S6: YES), the node 2 identifies (S7) whether or not the "mounted" flag is in the OFF condition. The "mounted" flag constitutes information indicating the condition that the filesystem is already mounted. If the filesystem is mounted, the mounted flag is in the ON condition; if the filesystem is not yet mounted, the mounted flag is in the OFF condition.

If a filesystem to which the actions of level 2 have been allocated is not yet mounted (S7: YES), the node 2 unmounts the target filesystem from the node 1 and mounts it at node 2 (S8). The node 2 then sets the mounted flag to the ON condition (S9).

If the actions of level 2 are not allocated to the filesystem whose access is requested by the host device 5 (S6: NO), the node 2 ascertains whether or not the actions allocated to this filesystem are those of level 3 (S10). A filesystem in respect of which the actions of level 3 are set is not mounted at the node 2, which is the failover target, but, if the node 1, which is the failover source node, is restored, is remounted at the node 1. Consequently, if the actions of level 3 are set for the filesystem that is the object of access (S10: YES), the node 2 performs error processing (S11). The host device 5 to which an error was returned from the node 2 then for example attempts re-access after a certain time. If, at this time point, the recovery of node 1 has been completed, the service is then provided through node 1.

If neither the actions of level 2 nor the actions of level 3 have been allocated to the filesystem whose access was requested from a host device 5 (S10: NO), the actions of level 1 are set for this filesystem. Since a level 1 filesystem is mounted on the node 2 substantially simultaneously with the commencement of failover, it can be used immediately. The node 2 then stores the access information in the access log (S12) and processes the access request (S13) from the host device 5.

Likewise, in the case of a level 2 filesystem also, if a filesystem is already mounted at the node 2 (S7: NO), the node 2 is capable of immediately utilizing this filesystem. It therefore updates the access log (S12) and processes the access request (S13).

An outline of the actions in access request acceptance processing as described above is as given below:—

(1) Normal Condition Prior to Occurrence of Failover:

The frequency of use of the updated filesystem is stored in the access log and the access request is processed.

(2) Case where a Level 1 Filesystem is Accessed after Occurrence of Failover:

Processing identical with that of the normal condition (1) is performed, since the level 1 filesystem is mounted with priority over the other filesystem.

(3) Case where a Level 2 Filesystem is Accessed after Occurrence of Failover:

If this filesystem is not mounted, it is mounted; if it is already mounted, processing identical to that in the normal condition (1) is performed.

(4) Case where a Level 3 Filesystem is Accessed after Occurrence of Failover:

This filesystem cannot be utilized from any of the nodes, so an error is returned to the host device 5.

Figure 5:
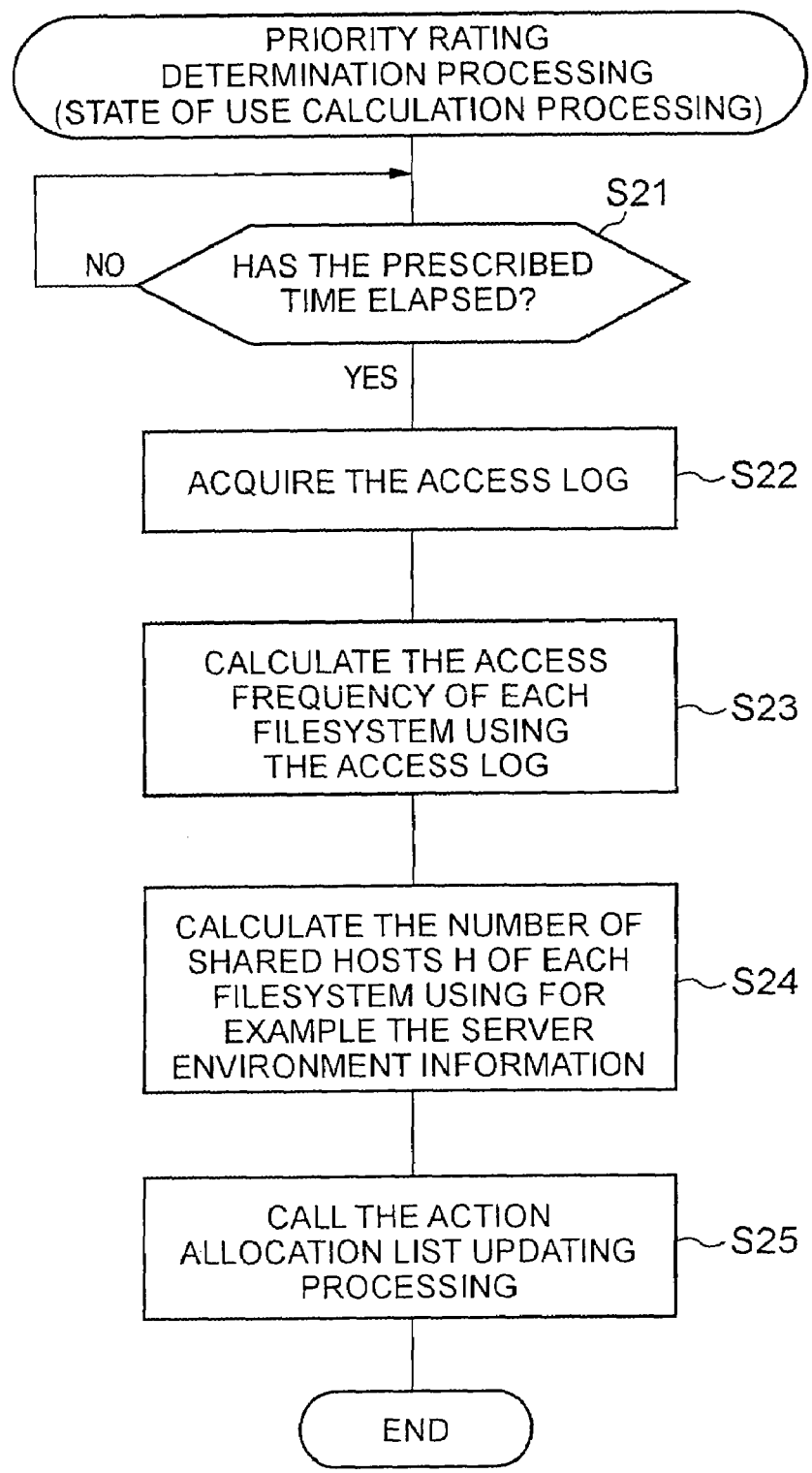
FIG. 5 is a flow chart showing part of the priority ranking determination processing.

Next, FIG. 5 is a flow chart showing an outline of the processing performed by the priority ranking determination processes 112, 212. This processing is batch processing that is executed periodically at the nodes 1 and 2 irrespective of whether or not failover has occurred.

The nodes 1 and 2 determine whether or not respective prescribed times have elapsed (S21). If a prescribed time has elapsed (S21: YES), the nodes 1 and 2 read and acquire (S22) the respective access logs T6. The nodes 1 and 2 may perform this processing in a synchronized fashion or the nodes 1 and 2 may perform this processing respectively according to independent cycles.

The nodes 1 and 2 calculate (S23) the access frequency L of each filesystem by using the access log T6. Also, the nodes 1 and 2 calculate (S24) the number H of host devices 5 that share each filesystem, for example using their own environmental information. After calculating the number H of shared hosts and the access frequency L to each filesystem, the nodes 1 and 2 call the action allocation list updating processing (S25). It should be noted that these number H of shared hosts and access frequency L may be for example respectively calculated as average values over a prescribed period.

Figure 6:
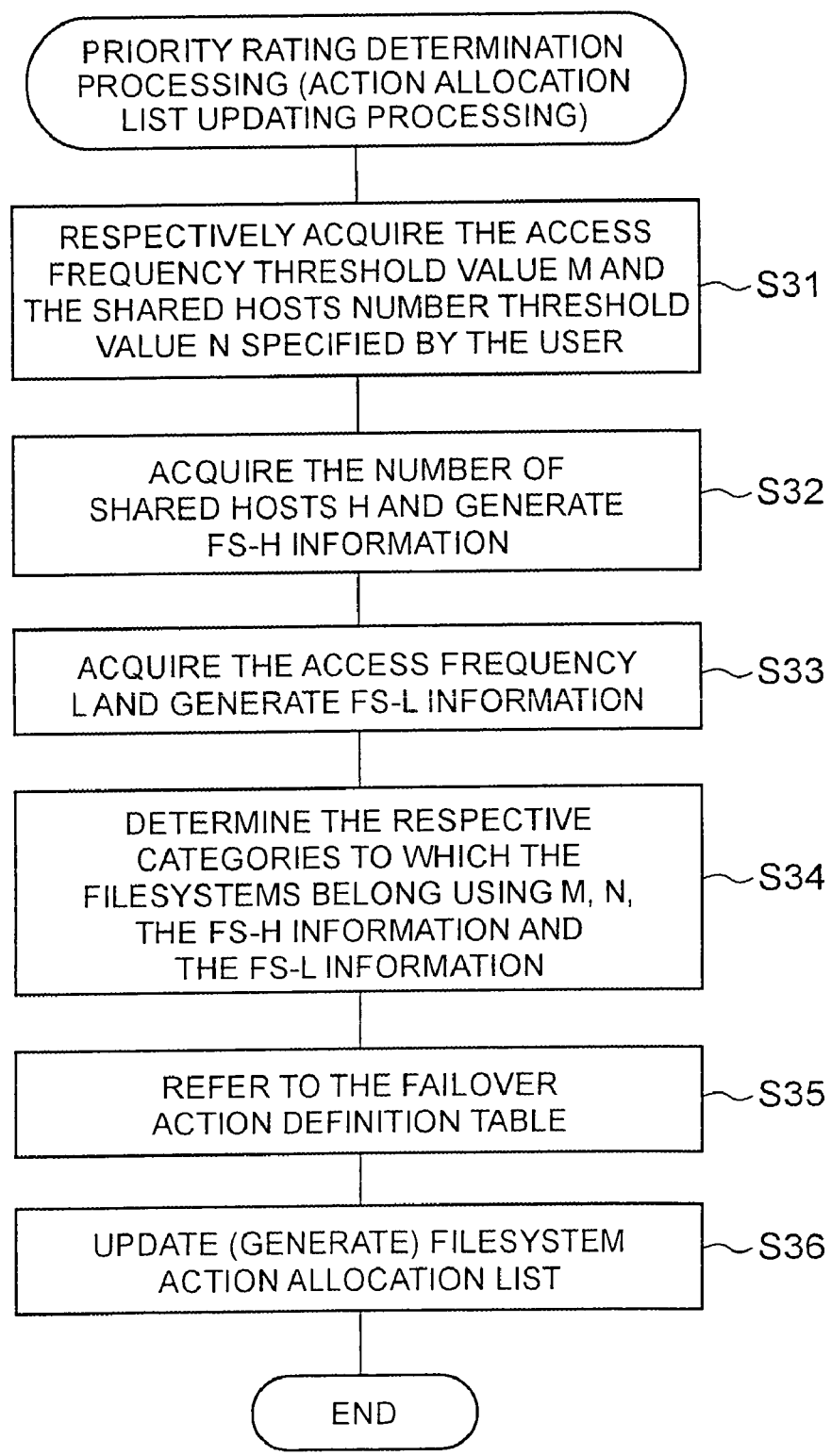
FIG. 6 is a flow chart showing a further part of the priority ranking determination processing.

FIG. 6 is a flow chart showing the updating processing of the action allocation list that is respectively executed by the priority ranking determination processes 112, 212. This processing is commenced by being called at S25 in FIG. 5.

First of all, the nodes 1 and 2 respectively acquire (S31) the access frequency threshold value m and the threshold value n for the number of shared hosts that are input from the user (for example system administrator). Each of the nodes 1 and 2 respectively reads the number H of shared hosts calculated in S24 above and generates (S32) filesystem shared hosts number information (hereinbelow referred to as FS-H information) that is used for managing the shared hosts number H of the filesystem. FIG. 7(*a*) shows an outline of the FS-H information T4. The FS-H information T4 lists for each filesystem the number H of host devices 5 that respectively share each filesystem.

Next, each of the nodes 1 and 2 respectively reads the access frequency L calculated in S23 above, and generates (S33) filesystem access frequency information (hereinbelow referred to as FS-L information) for managing the access frequency L of each filesystem. As shown in FIG. 7(*b*), the FS-L information T5 lists for each filesystem the access frequency L in respect of each filesystem. The method of generating the FS-L information T5 is described later.

The nodes 1 and 2 respectively determine (S34) the categories to which each filesystem is to belong, in accordance with the threshold values m, n that are input by the user and in accordance with the FS-H information T4 and FS-L information T5. The details of the category determination processing will be described later.

Next, the nodes 1, 2 generate or update (S36) the action allocation list T3 using the actions on failover that are set for each category and the categories to which each of the filesystems belong, by referring (S35) to the failover action definition table T2. This action allocation list T3 is stored at a prescribed location on the shared LU 4 and is shared by all of the nodes 1, 2 that constitute the cluster.

Figure 8:
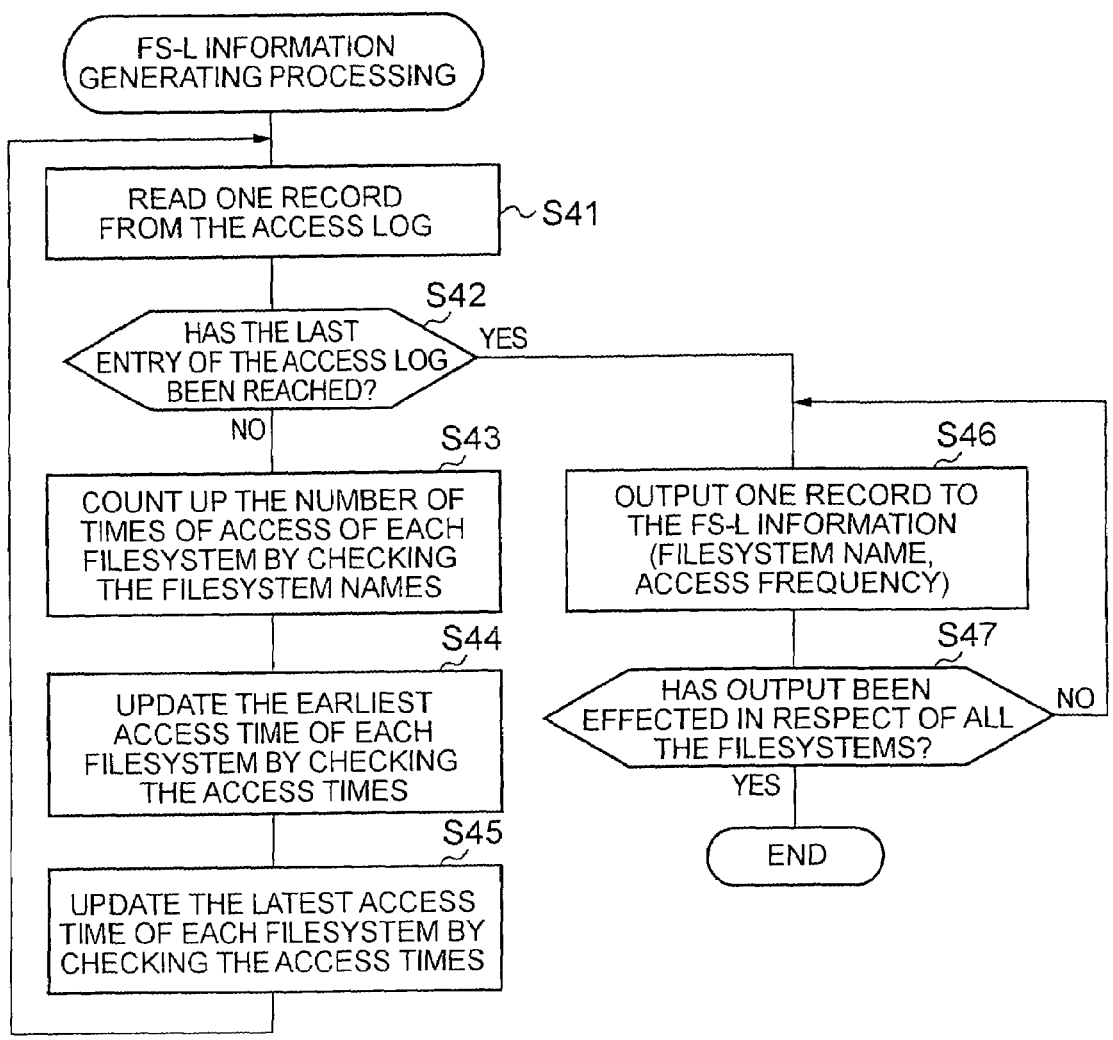
FIG. 8 is a flow chart showing processing for generating filesystem-access frequency information.

FIG. 8 is a flow chart showing the FS-L information generating processing that is executed by the priority ranking determination processes 112, 212.

First of all, the nodes 1 and 2 respectively read (S41) information corresponding to a single record from the respective access logs T6, and determine (S42) whether or not reading of the access log T6 has reached the last entry (EOF).

If the last entry of the access log T6 has not yet been reached (S42: NO), the nodes 1 and 2 detect the name of the filesystem from information corresponding to one record and count (S43) the number of times of access of each filesystem. For example, if the record that is read indicates access of FS1A, the counter variable for counting the access frequency of FS1A is incremented by 1.

The nodes 1 and 2 detect the access time from the record that has thus been read and update the earliest access time of each filesystem (S44). Also, the nodes 1 and 2 update (S45) the latest access time of each of the filesystems using the access time. That is, if the access time of the record that has been read indicates a time prior to the earliest access time, the earliest access time is updated. In the same way, if the access time of the record that has been read indicates a time that is later than the last access time, the last access time is updated. By repeating this operation for the entire access log T6, the earliest access time and the latest access time recorded in the access log T6 can be respectively detected. In other words, the recording period of the access log T6 can be found.

If the processing of S43 to S45 has been performed in respect of all of the records of the access log T6 (S42: YES), the nodes 1 and 2 calculate the access frequency L for each of the filesystems and output a single record to the FS-L information T5 (S46). S46 is repeated (S47) until output to the FS-L information T5 has been completed in respect of all of the filesystems. The access frequency L can then be found for example by dividing the total number $\Sigma L$ of accesses to the filesystem by the time from the earliest access time Told to the latest access time Tnew ($L=\Sigma L/(Tnew-Told)$).

Figure 9:
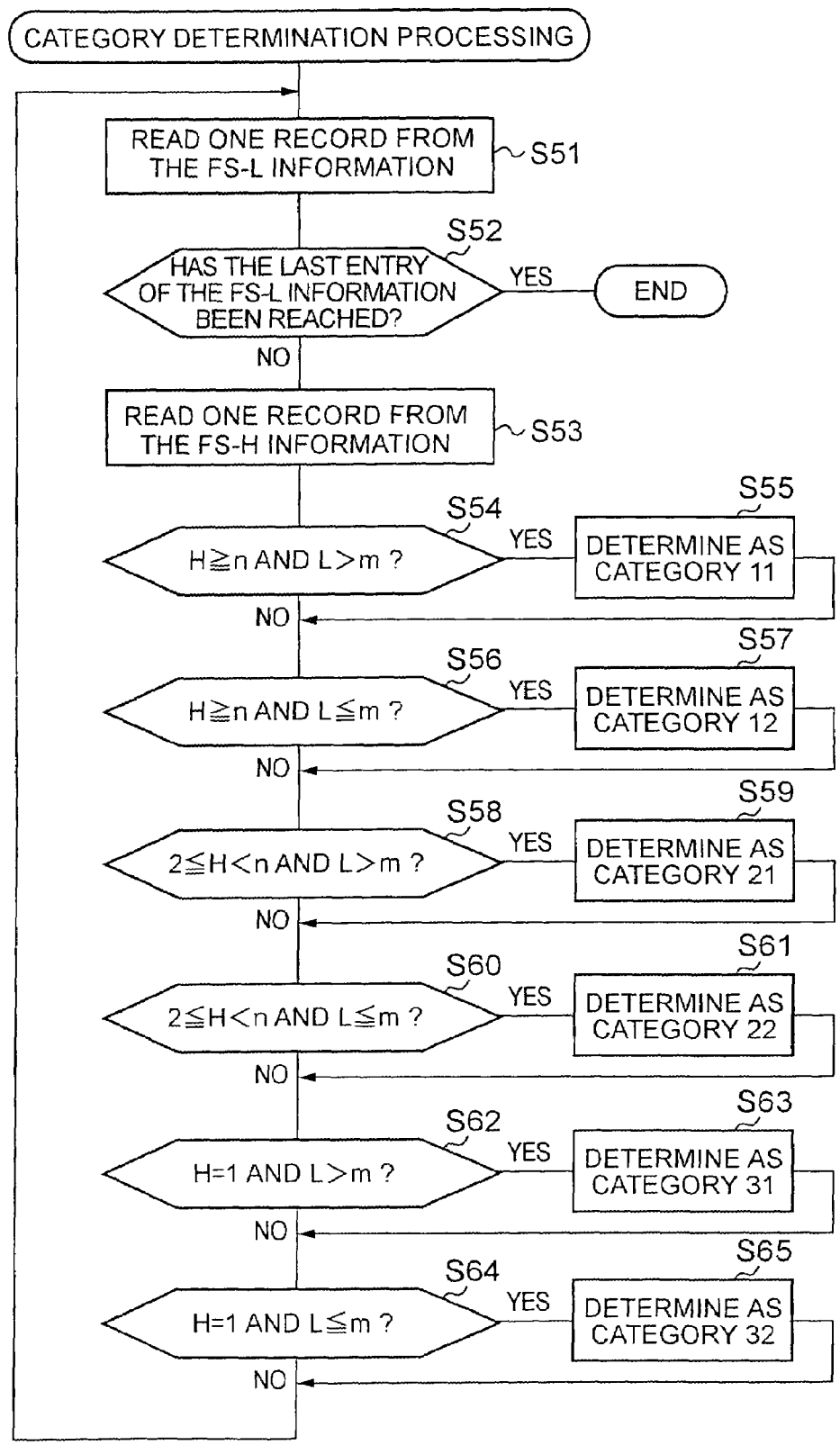
FIG. 9 is a flow chart showing category determination processing.

FIG. 9 shows the category determination processing for the various filesystems that is executed by the priority ranking determination processes 112, 212 of the nodes 1 and 2. This processing corresponds to S34 in FIG. 6.

The nodes 1 and 2 read the information of a single record (S51) from the FS-L information T5 and determine whether or not the last entry of the FS-L information T5 has been reached (S52). The following processing is repeated until the affiliation categories have been determined for all of the filesystems stored in the FS-L information T5.

The nodes 1 and 2 then read information corresponding to a single record (S53) from the FS-H information T4. It will be assumed that the FS-H information T4 and FS-L information T5 has been sorted in accordance with the respective filesystem names and that the number of records of both of these is the same. Consequently, the record that is read from the FS-L information T5 and the record that is read from the FS-H information T4 both indicate the properties (access frequency L and shared hosts number H) relating to the same filesystem.

Hereinbelow, as described above in connection with the category determination table T1, each filesystem is categorized into a single category of one of six categories in accordance with two indices, namely, the shared host number H and access frequency L.

If the number H of shared hosts relating to the filesystem is equal to or more than the threshold value n ($H \geq n$) and the access frequency L is greater than m ($L>m$), the filesystem is determined to be in category 11 (S54: YES, S55).

If the number H of shared hosts of the filesystem is equal to or more than the threshold value n ($H \geq n$) and the access frequency L is less than or equal to m ($L \leq m$), the filesystem is determined to be in category 12 (S56: YES, S57).

If the number H of shared hosts of the filesystem is two or more and less than n ($2 \leq H<n$) and the access frequency L is greater than m ($L>m$), the filesystem is determined to be in category 21 (S58: YES, S59).

If the number H of shared hosts of the filesystem is two or more and less than n ($2 \leq H<n$) and the access frequency L is less than or equal to m ($L \leq m$), the filesystem is determined to be in category 22 (S60: YES, S61).

If the number H of shared hosts of a filesystem y is one ($H=1$) and the access frequency L is greater than m ($L>m$), the filesystem is determined to be in category 31 (S62: YES, S63).

If the number H of shared hosts of a filesystem y is one ($H=1$) and the access frequency L is no more than m ($L \leq m$), the filesystem is determined to be in category 32 (S64: YES, S65).

As described above, the priority ranking determination processes 112, 212 respectively detect the state of use of each filesystem (access frequency L and shared hosts number H) and categorize the filesystems into one of a plurality of prepared categories in accordance with the state of use of each filesystem. The priority ranking determination processes 112, 212 then respectively confer a level specifying the actions on failover of each filesystem in accordance with the categories of the filesystems. These processes are respectively executed at the nodes 1 and 2 and the action allocation lists T3 respectively generated at the nodes 1 and 2 are stored in the shared LU 4.

Figure 10:
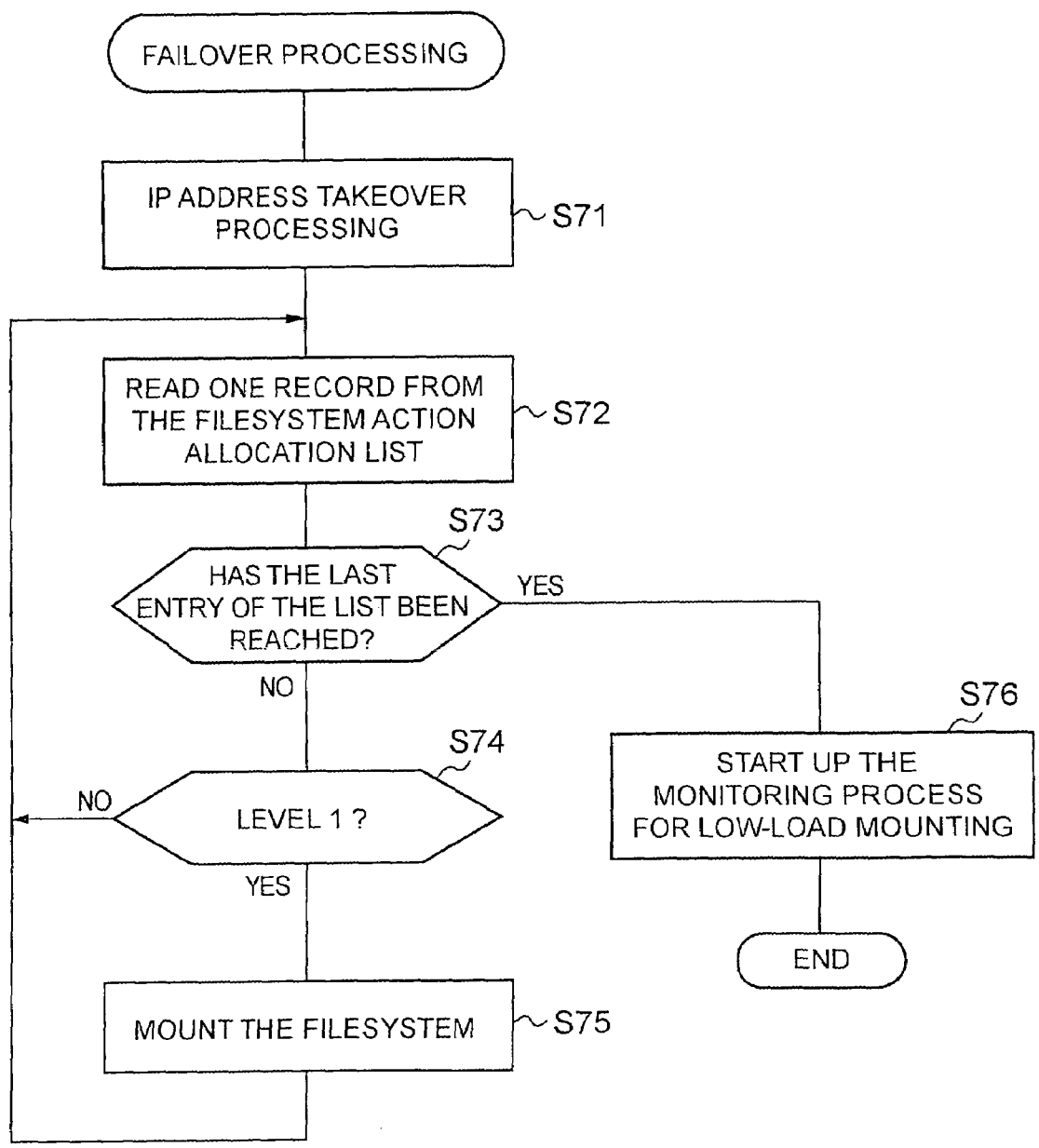
FIG. 10 is a flow chart showing failover processing.

FIG. 10 is a flow chart showing the processing that is executed by the failover processes 121, 221. An example will be described in which the failover target is taken to be the node 2, but the same would apply in the case where the node 1 is the failover target.

The failover process 221 of the node 2 is executed in response to notification from the heartbeat monitoring process 222. For example, if a fault such as circuit disconnection or system-down occurs at the node 1, the heartbeat communication is interrupted and cessation of this heartbeat communication is detected by the heartbeat monitoring process 222. If the heartbeat communication is stopped for more than a prescribed time, the heartbeat monitoring process 222 determines that the node 1 has stopped and starts up the failover process 221.

The failover target node 2 first of all performs takeover of the IP address (S71). In this way, the host devices 5 can utilize the business service simply by connecting to the IP address as previously. From a host device 5, the entire cluster appears as a single server. The host devices 5 do not recognize that the current server has changed as a result of implementation of failover within the cluster.

After takeover of the IP address has been completed, the node 2 accesses the shared LU 4, refers to the action allocation list T3 generated by the node 1 and reads information corresponding to one record (S72). The following processing is repeated until the last entry of the action allocation list T3 is reached (S73: NO). That is, the node 2 determines whether or not the actions of level 1 are associated with the filesystems registered in the action allocation list T3 (S74). In the case of a filesystem for which level 1 is set (S74: YES), the node 2 immediately starts mounting of this filesystem (S75).

For the filesystems that are read from the action allocation list T3, if another level (level 2 or level 3) other than level 1 is set (S74: NO), the next record is read without taking any action (S72).

Then, after inspecting all of the filesystems (S73: YES) that have been registered in the action allocation list T3, a monitoring process of low-load condition mounting is started up (S76). This monitoring process is described later.

As described above, in failover processing, the actions of level 1 i.e. mounting on execution of failover of only those filesystems for which immediate mounting has been specified are performed beforehand but mounting processing at the commencement of failover is not performed in respect of filesystems that have been assigned a level other than this. It therefore suffices, on commencement of failover, for example to unmount from the node 1 only those filesystems for which level 1 was set and to mount these at the node 2; the business services that utilize the level 1 filesystems can thus be restarted rapidly.

Figure 11:
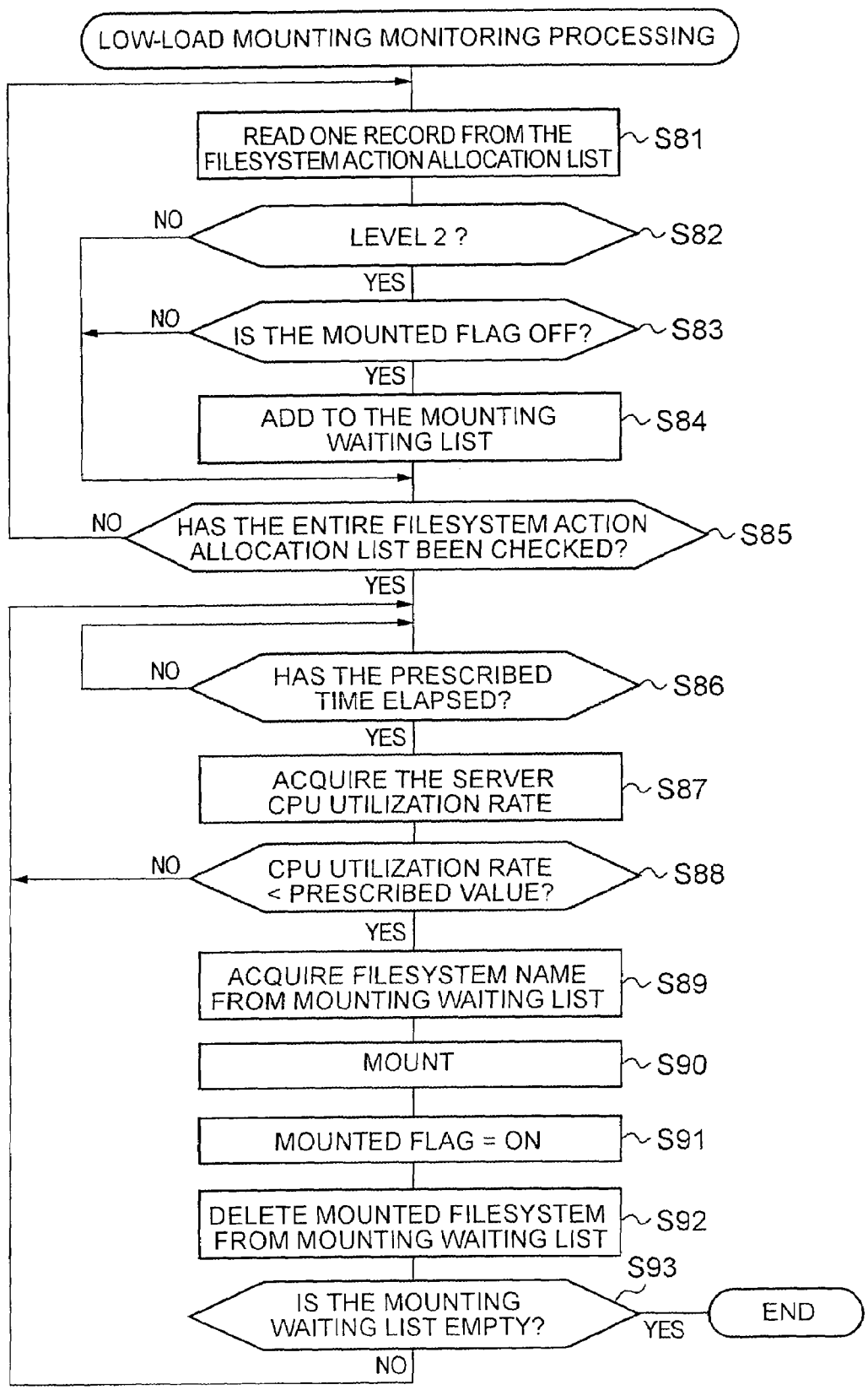
FIG. 11 is a flow chart showing takeover processing when the failover target is in a low-load condition.

FIG. 11 is a flow chart showing the processing for mounting when there is a low-load condition at the failover target. This processing corresponds to S76 in FIG. 10. As described below, this processing comprises two portions. One of these is processing (S81 to S85) whereby level 2 filesystems that have not yet been mounted are detected and registered in a waiting queue; this may be termed "detection processing of resources awaiting mounting". The other portion (S86 to S93) is processing to mount at the failover target node filesystems that were registered in the waiting queue, when the failover target node has reached a prescribed low-load condition; this may be termed "transfer processing during low load".

The node 2, which is the failover target, reads (S81) information corresponding to one record from the action allocation list T3. The node 2 determines (S82) whether or not the level 2 actions are set in respect of the filesystem that is specified in the record that has thus been read. In the case of a level 2 filesystem (S82: YES), the node 2 determines (S83) whether or not the "mounted" flag is in the OFF condition. If a filesystem that has been assigned to level 2 has not yet been mounted at the node 2 (S83: YES), the node 2 registers this filesystem in the mounting waiting list (S84).

The node 2 then repeats (S85) the processing of S81 to S84 until inspection of all of the filesystems registered in the action allocation list T3 has been completed. In this way, all of the level 2 filesystems in respect of which no access request has yet been generated after commencement of failover are detected and added to the mounting waiting list.

After all of the level 2 filesystems that have not been mounted had been detected, the node 2 for example waits for a prescribed time (S86) of the order of a few minutes to a few tens of minutes. After the prescribed time has elapsed (S86: YES), the node 2 acquires the current CPU utilization rate (S87). The node 2 determines (S88) whether or not the current CPU utilization rate is less than a prescribed pre-set value. This prescribed value can be set manually by the system administrator or may be automatically set for example in accordance with other environmental information.

If the CPU utilization rate is equal to or more than the prescribed value (S88: NO), the node 2 returns again to S86 and waits for the prescribed time. On the other hand, if the CPU utilization rate is lower than the prescribed value (S88: YES), the node 2 is in a low-load condition, which is a condition in which no effect on response performance of the existing business services may be expected to be produced by the processing accompanying filesystem transfer, such as unmounting processing or mounting processing.

Thereupon, the node 2 acquires (S89) the name of a filesystem that is registered in the mounting waiting list and mounts (S90) this filesystem at the node 2. The node 2 then sets (S91) the mounted flag in the ON condition in respect of this mounted filesystem. Also, the node 2 deletes (S92) the name of this filesystem that has thus been mounted from the mounting waiting list. The node 2 repeats (S93) the processing of S86 to S92 until the mounting waiting list is empty. It should be noted that if the node 1 recovers and a failback request is issued before the mounting waiting list becomes empty, and the mounting waiting list is deleted.

In this way, with this processing, a filesystem that has been allocated to level 2 is transferred to the failback target if the failback target node is in a low-load condition, even before any access request is generated. A level 2 filesystem is therefore taken over from the node 1 to the node 2 in two cases. The first case is that access is generated to the level 2 filesystem (on-demand mounting) and the other case is the case where the failover target node is in a prescribed low-load condition (low-load mounting).

In this embodiment, on-demand mounting and low-load mounting can be respectively independently executed. When an access request is generated to a level 2 filesystem, even if the failover target node is not in a low-load condition, takeover processing is commenced. In this way, takeover of a level 2 filesystem is made possible by a plurality of methods, so the probability that an access request to the level 2 filesystem can be processed at an early stage is increased.

The index for detecting the low-load condition is not restricted to the CPU utilization rate. For example, the number of input/output requests per unit time (IOPS) or the rate of use of cache memory may be employed and a decision can be made by combining a plurality of indices.

FIG. 12 and FIG. 13 are diagrams showing schematically how failover is executed in stepwise fashion according to this embodiment. For convenience in description, only the filesystems at the node 1 are shown in FIG. 12 and FIG. 13.

FIG. 12 will now be referred to. Three filesystems FS1A to FS1C are provided at the node 1. In FIG. 12, the filesystem FS1A is set as level 1 and the filesystems FS1B, FS1C are respectively set as level 2.

If a fault occurs at a time point T1, when failover is commenced, takeover processing from the node 1 to the node 2 is started in respect of the level 1 filesystem FS1A. Takeover processing from the node 1 to the node 2 is not performed in respect of the other filesystems FS1B and FS1C. The node 2 mounts only the level 1 filesystem FS1A at the node 2 and restarts the business service that utilizes the filesystem FS1A.

If, at a time-point T2, there is an access request to the filesystem FS1B, the node 2 unmounts the filesystems FS1B from the node 1 and mounts the filesystems FS1B at the node 2.

If, at the time-point T3, the node 2 is in a low-load condition, the node 2 commences takeover processing of the filesystem FS1C that was left on the node 1. Consequently, even if no access request is made to the filesystem FS1C after commencement of failover, if the node 2 is in a prescribed low-load condition, the level 2 filesystem FS1C is taken over from the node 1 to the node 2. If therefore, after the time-point T3, an access request to the filesystem FS1C is generated, since mounting processing has already been completed, the access request can be processed rapidly.

If at the time-point T4 the node 1 has recovered from a fault, the node 1 may request failback in respect of the node 2. When the node 2 receives the failback request, it unmounts the filesystems FS1A to FS1C that were taken over from the node 1 so that these can be returned to the node 1. If failback is performed, all of the filesystems FS1A to FS1C that were taken over from the node 1 may be simultaneously returned to the node 1, or they may be returned in stepwise fashion with priority ranking in substantially the same way as in the case of failover. Specifically, it may be arranged that the filesystem FS1A, which has a high priority ranking, is returned to the node 1 first and the remaining filesystems FS1B, FS1C are returned in stepwise fashion for example when an access request is generated or when the node 1 is in a prescribed low-load condition or after lapse of a prescribed time.

FIG. 13 is a diagram showing the actions on failover in another case. In FIG. 13, level 1 is set for the filesystem FS1A, level 2 is set for the filesystem FS1B and level 3 is set for the filesystem FS1C, respectively. That is, the level which is set for the filesystem FS1C is different in FIG. 12 and FIG. 13.

If a fault occurs in the node 1 at a time point T1, when failover is commenced, the level 1 filesystem FS1A is taken over from the node 1 to the node 2. If, at a time-point T2, an access request to the level 2 filesystem FS1B is generated, the filesystem FS1B is taken over from the node 1 to the node 2.

Level 3 actions are set for the filesystem FS1C. Consequently, takeover processing to the node 2 is not performed in the case of the filesystem FS1C. If access to the filesystem FS1C is requested from a host device 5 during the failover period, an error is returned to the host device 5.

If, at the time-point T4, the node 1 has recovered and issues a failback request, the node 2 returns the filesystems FS1A, FS1B that were taken over from the node 1 to the node 1. The filesystem FS1C is remounted at the node 1. Takeover processing of the level 3 filesystem FS1C is not performed during failover but the level 3 system FS1C is remounted during failback. There is therefore no need to perform takeover processing of the filesystem FS1C during failover. Also, there is no need to perform processing for unmounting the filesystem FS1C from the node 2 during failback.

Thanks to the construction as described above in this embodiment, the following effects are obtained. In this embodiment, the construction is such that, when failover is performed, takeover to the failover target node can be performed in stepwise fashion rather than performing takeover of all of the filesystems of the failover object en masse. By performing partial takeover processing in stepwise fashion, the time required to restart the business services can be reduced. Freedom of use is therefore improved, since the business services provided by the failover source can be restarted in a partial and stepwise fashion.

The present embodiment was constructed so as to make possible stepwise takeover of filesystems in accordance with a priority ranking set for the filesystems that are the object of failover. Takeover can therefore be performed first to a failover target node of filesystems which have the highest degree of priority. In this way, restarting can be effected in prioritized fashion starting from business services that have a high degree of importance, postponing the restarting of business services of a low degree of importance until later. The time required for restarting of business services of a high degree of priority can therefore be shortened.

In this embodiment, a construction was adopted in which a priority ranking was set in accordance with the state of use of the filesystem and the filesystems were transferred in accordance with their priority ranking. Takeover processing can therefore be formed starting for example from filesystems that are objects to frequent access and that are utilized by a large number of host devices 5, thereby making it possible to restart business services of a high degree of priority at an early stage.

In this embodiment, a construction is adopted wherein the takeover information such as the action allocation list is stored in a shared LU 4 and this takeover information is shared by the nodes 1 and 2. The nodes 1 and 2 can therefore execute failover in stepwise fashion simply by accessing the shared LU 4. Since the takeover information is stored in centralized fashion on a shared LU 4, the construction can be simplified. For example, instead of a shared LU 4, a method may be considered in which the takeover information is copied between each node. If the takeover information of the node 1 is copied to the node 2 and the takeover information of the node 2 is copied to the node 1, the construction becomes complicated and synchronization of the takeover information becomes difficult. However, it should be noted that a construction in which the takeover information is copied between the nodes is included in the scope of the present invention.

In this embodiment, a construction was adopted in which takeover actions of a plurality of types were prepared for the level 1 in which takeover processing is executed immediately on commencement of failover and level 2, in which takeover processing is not performed on commencement of failover but takeover processing is performed when an access request is generated. Takeover processing of filesystems of higher degree of priority can therefore be executed first by for example allocating the actions of level 2 to filesystems whose state of use is comparatively inactive and allocating the actions of level 1 to filesystems whose state of use is active. Also, takeover processing can be performed as required of filesystems of relatively low degree of priority. As a result, the response of the overall failover system can be improved.

In this embodiment, a construction was adopted in which a low-load mounting mode was provided, in which filesystem takeover is effected in cases where the failover target node is in a prescribed low-load condition. Takeover processing can therefore be completed at an earlier stage than in the case where takeover processing is executed irrespective of the load condition of the failover target node, thereby improving response.

Also, in this embodiment, in the case of a level 2 filesystem in respect of which takeover processing is commenced triggered by generation of an access request, even if no access request is in fact generated, the construction is such that takeover processing is still executed when the failover target node reaches a prescribed low-load condition. Transfer of the level 2 filesystem to the failover target node can therefore be effected at an earlier stage, making it possible to process an access request rapidly when an access request in respect of this level 2 filesystem is generated.

In this embodiment, a construction was adopted in which level 3 takeover actions, according to which takeover processing is not executed, are prepared even in cases where failover has been commenced. Since the actions of level 3 are allocated to filesystems of low degree of utilization, there is therefore no need to perform the various processes accompanying failover such as unmounting processing or mounting processing in respect of these filesystems, so takeover processing of other filesystems of higher degree of utilization can be completed at an earlier stage. Also, unmounting processing at the failback target node is unnecessary in the event of failback, making it possible to complete failback at an earlier stage.

[Embodiment 2]

A second embodiment of the present invention is described with reference to FIG. 14 to FIG. 16. This embodiment corresponds to a modified example of the first embodiment. The characteristic feature of this embodiment is that the present invention is applied in the case where a cluster is constituted of three or more servers.

Figure 14A:
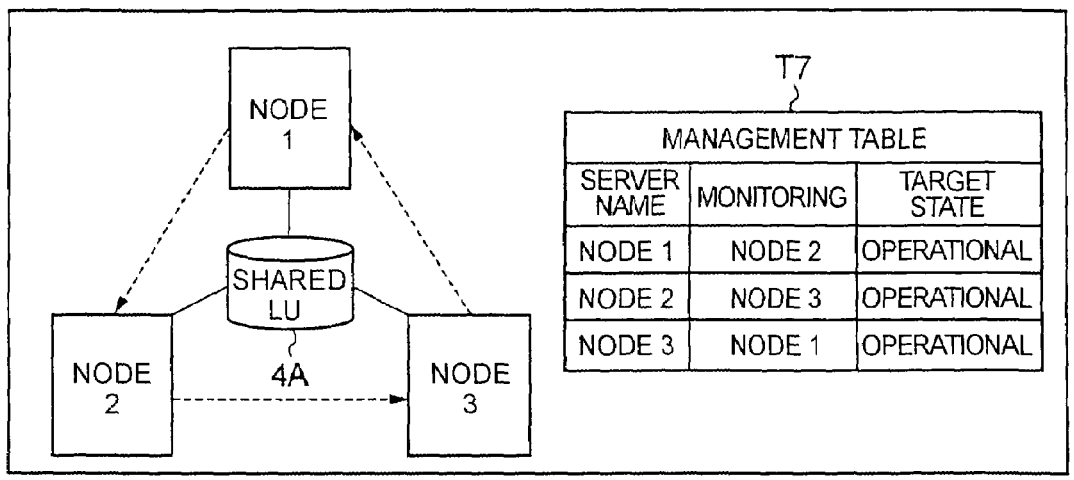
FIG. 14 relates to a second embodiment of the present invention and is a diagram showing schematically the case where a cluster is constituted by three or more nodes.

FIG. 14 is a diagram showing this embodiment schematically. As shown in FIG. 14(a), this failback cluster system is constructed including a total of three nodes, namely, node 1, node 2 and node 3. The nodes 1 to 3 share for example information that is employed in failover, through a common LU 4A.

The node 1 monitors the node 2, the node 2 monitors the node 3 and the node 3 monitors the node 1, respectively. In the failover management table T7, the name of the monitoring target server and the condition of this monitoring target server are associated, for each server. This management table T7 is stored in a shared LU 4A and is shared by the nodes 1 to 3. Also, each of the nodes 1 to 3 respectively monitors the state of use of the respective filesystems and one of the sets of actions of levels 1 to 3 is allocated to these filesystems in accordance with such state of use. The action allocation list generated at each of the nodes 1 to 3 is stored in the shared LU 4.

Figure 14B:
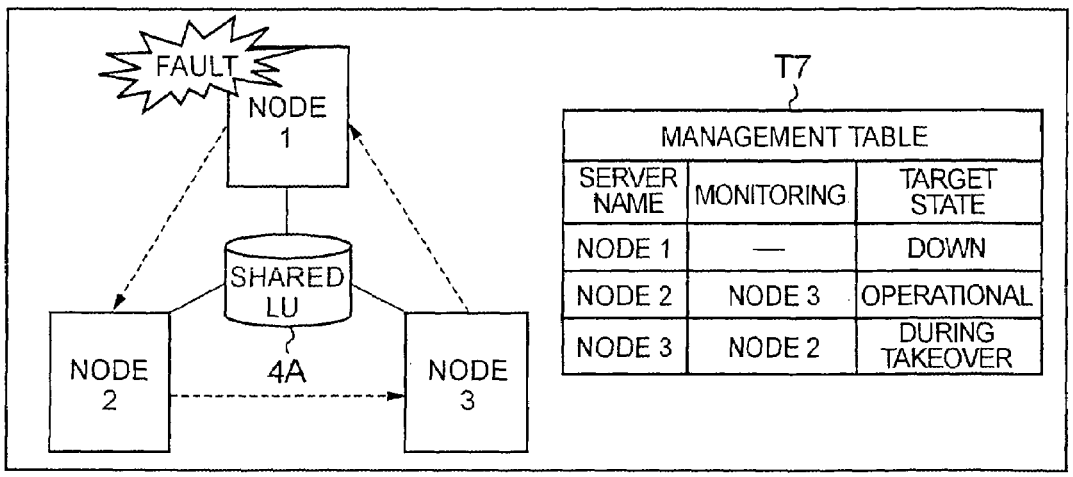
Figure 15:
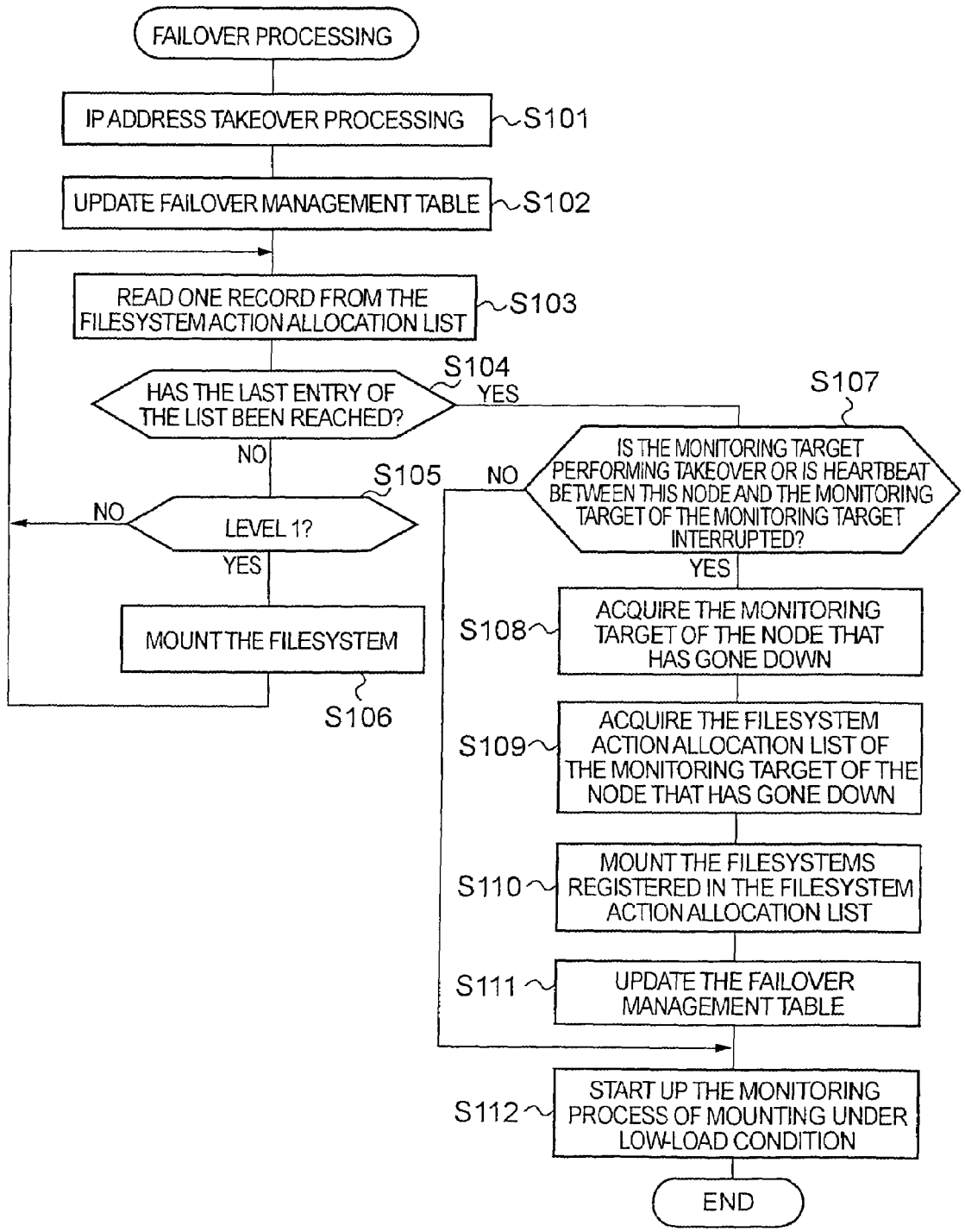
FIG. 15 is a flow chart of failover processing.

As shown in FIG. 14(b), when the system at the node 1 goes down as a result of a fault, the node 3 takes over the business service that is provided at the node 1. The state of the node 3 is altered from "operating" to "performing takeover". The state of the node 1 is altered from "operating" to "down". Also, accompanying the system-down of the node 1, the monitoring targets of the nodes 2 and nodes 3 are respectively altered. The node 2 and the node 3 now mutually monitor each other.

Figure 14C:
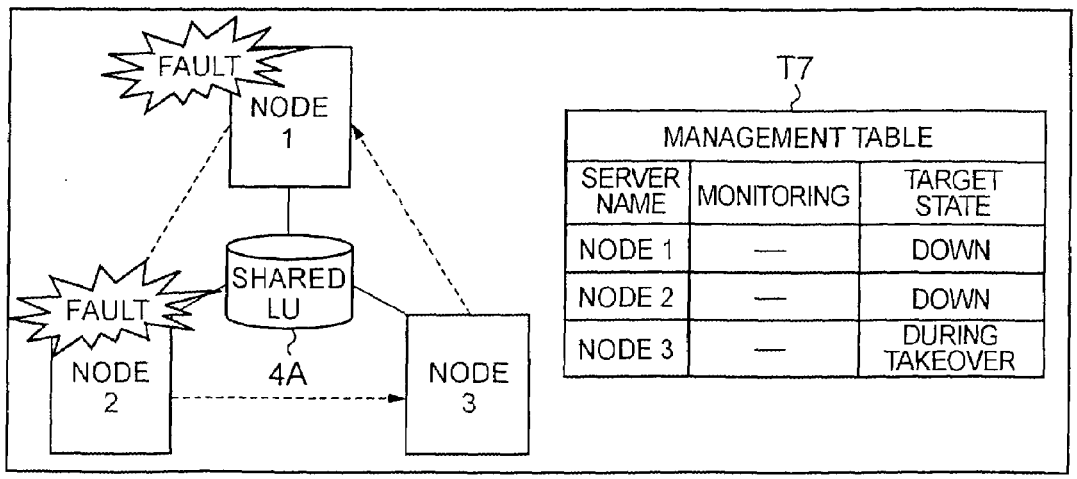

As shown in FIG. 14(c), if the system of the node 2 also goes down prior to recovery of the node 1, the business services that was provided by the node 2 is taken over by the node 3. The result is therefore that the node 3 takes over all of the business services that were respectively provided by both the node 1 and the node 2.

In the case where a failover cluster is constituted by three or more nodes, as shown in FIG. 14, it is necessary to give consideration to the probabilities that faults will occur in the respective plurality of nodes. Failover processing of this embodiment is shown in FIG. 15.

The failover target node starts failover processing in response to detection of system-down as a result of interruption of heartbeat communication. The failover target node then takes over (S101) the IP address of the failover source node and updates (S102) the condition of the failover management table T7.

Next, the node reads (S103) the information of one record from the action allocation list and determines (S104) whether or not the last entry of the action allocation list has been reached. The node then makes a decision (S105), in respect of all of the filesystems listed in the action allocation list, as to whether or not the actions of level 1 are set. If the actions of level 1 are set (S105: YES), the node then performs takeover processing (S106) of such filesystems.

When the node has completed takeover processing of all of the filesystems to which the actions of level 1 have been allocated (S104: YES), the node then ascertains whether the condition of the monitoring target node is "performing takeover" or whether the heartbeat communication between the node that is being monitored by the monitoring target node and itself is interrupted.

For example, if this failover processing is being executed by the node 3, its monitoring target node is the node 1 and the monitoring target of this monitoring target node is the node 2. In S107, the node 3 determines whether or not the condition of the node 1, which is its monitoring target, is "performing takeover". If the condition of the monitoring target node is "performing takeover", the system of the node 1 has gone down right in the middle of takeover of the business services of the node 2 by the node 1. Consequently, in this case, the node 3 must take over not only the business services that were provided by the node 1 but also the business services that were provided by node 2.

Also, in the above example, the node 3 ascertains whether or not the heartbeat communication between the monitoring target node i.e. the monitoring target (node 2) of the node 1 and itself is interrupted. This envisions the case where the systems of the node 2 and the node 1 go down substantially simultaneously. In this case also, it is necessary for the node 3 to take over the business services provided by the node 2 in addition to the business services provided by the node 1.

Accordingly, if the system of the monitoring target node goes down during takeover processing, or if the system of the monitoring target node and the system of the node that was being monitored by the monitoring target node both go down substantially simultaneously (S107: YES), the identity of the node that was being monitored by the monitoring target node on system-down may be acquired (S108) by referring to the management table T7. In the above example, the node 3 ascertains that the monitoring target of the node 1 was the node 2.

Thus, the failback target node (in the above example, node 3) acquires (S109) the action allocation list T3 relating to the monitoring target of the monitoring target node from the shared LU 4A. This failback target node mounts the filesystems registered in this action allocation list T3 at the failback target node itself, in accordance with their levels (S110).

In the above example, the node 3, which is the only node that is working of the three nodes, acquires the action allocation list T3 of the node 2, which is the monitoring target of the monitoring target node and performs takeover of the file servers registered in this action allocation list T3. In this case, the node 3 does not take over all of the filesystems of the node 2 at once but rather, as described in the first embodiment, takes over in prioritized fashion only those filesystems in respect of which the actions of level 1 have been set.

The node that has taken over the level 1 filesystems updates (S111) the monitoring target of the failover management table T7 and starts up (S112) the monitoring process for mounting under low-load conditions. It should be noted that if it is not the case that the systems of a plurality of nodes in the cluster are simultaneously down (S107: NO), the processing of S108 to S111 is skipped and processing returns to S112.

Figure 16A:
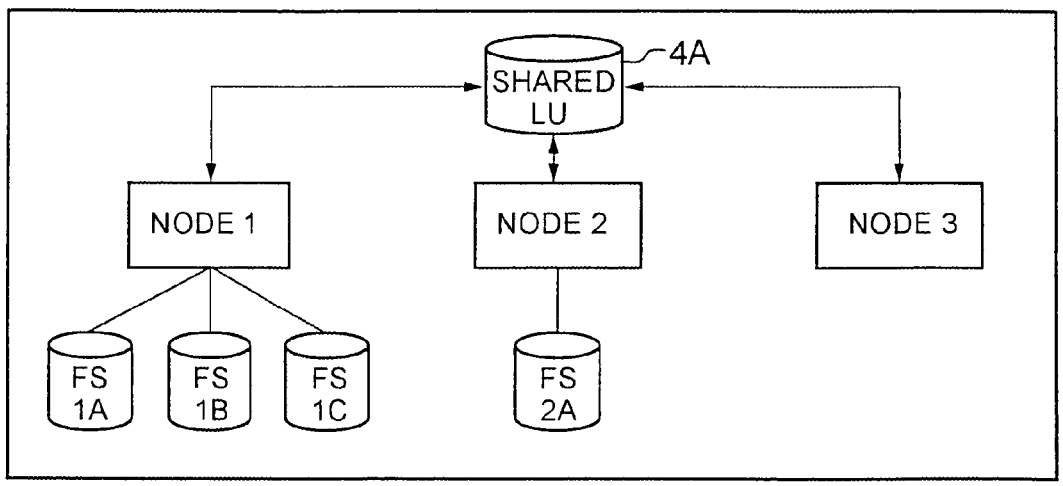
FIG. 16 is a diagram showing how failback occurs when a plurality of nodes are simultaneously down in a cluster constituted by three or more nodes.

FIG. 16 is a diagram showing schematically an outline of failover processing according to this embodiment. As shown in FIG. 16(a), the node 1 comprises three filesystems, namely, FS1A to FS1C and the node 2 comprises a single filesystem, namely, FS2A. The level 1 actions are respectively set for the filesystems FS1A, FS2A. Also, in a reversal of the example shown in FIG. 14, in FIG. 16, the monitoring target of the node 3 is set as the node 2, the monitoring target of the node 2 is set as the node 1 and the monitoring target of the node 1 is set as the node 3.

Figure 16B:
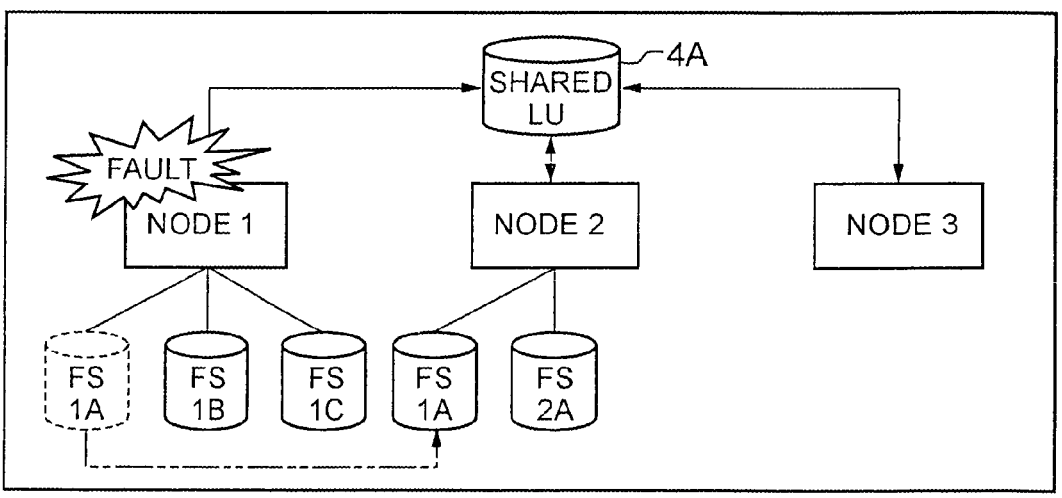

As shown in FIG. 16(b), when occurrence of a fault in the node 1 causes the system of the node 1 to go down, the node 2, which is the failover target of the node 1, takes over the level 1 filesystem FS1A from the node 1.

Figure 16C:
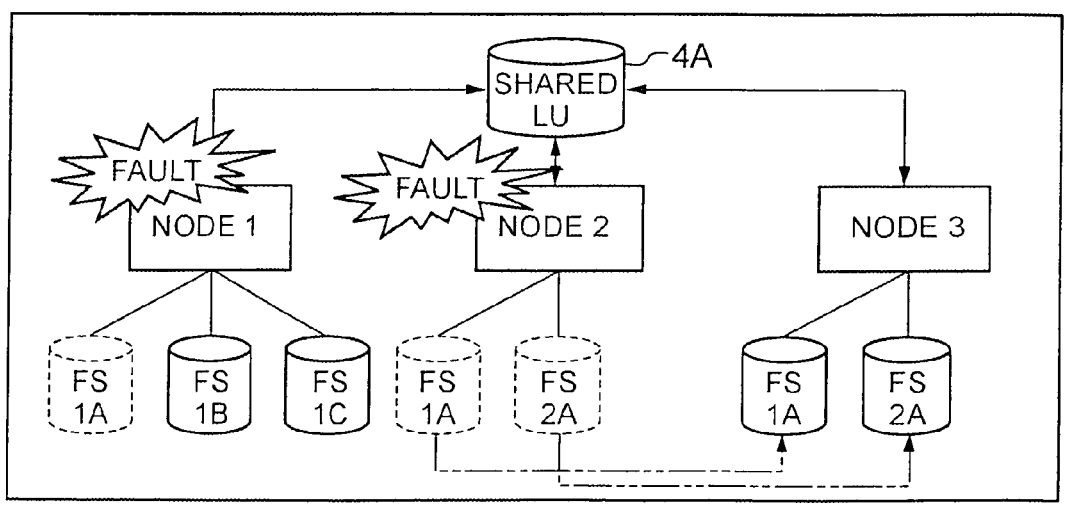

As shown in FIG. 16(c), if the system at the node 2 also goes down due to occurrence of a fault prior to recovery of the node 1, the node 3, which is the failover target of the node 2, takes over from the node 2 both of the filesystems FS1A, FS2A in respect of which level 1 actions are set. If the system of the node 2 has gone down during takeover from the node 1, the node 3 takes over the filesystem FS2A from the node 2 and takes over the filesystem FS1A from the node 1.

As described above, the present invention can be effectively applied even in cases comprising three or more nodes, the same effects as in the case of the first embodiment being obtained.

It should be noted that the present invention is not restricted to the embodiments described above. A person skilled in the art may make various additions and modifications and the like within the scope of the present invention. For example, it is not necessary to adopt all of levels 1 to 3 and arrangements could be adopted employing a plurality of levels, for example only level 1 and level 2 or only level 1 and level 3 or only level 2 and level 3.

Also, although the mode in which takeover processing is executed only in the case of a low-load condition was described as being a case employed in association with level 2 filesystems, an arrangement could be adopted in which this level in which takeover processing is executed in low-load condition is independently set up as a separate level from level 2. In this case, takeover processing of filesystems in respect of which the level has been set in which takeover processing is performed under low-load conditions is performed for example only in the case of a prescribed low-load condition of the failover target node, irrespective of whether or not there is an access request from a host device.

Also, although filesystems were taken as an example of a failover object resource, the present invention is not restricted to this and could be applied for example to other resources such as application programs that utilize a filesystem.

What is claimed is:

1. A failover cluster system in which a plurality of computers are connected and failover object resources of a failover source computer are taken over by a failover target computer, comprising a control section that takes over said failover object resources in stepwise fashion in accordance with a priority ranking set for said failover object resource, wherein said priority is set by the state of use of said failover object resource;

wherein each of said computers employs a shared memory device to share takeover information relating to takeover of said failover object resources and said control section can thus take over said failover object resources in stepwise fashion in accordance with said priority ranking, by referring to the takeover information of said shared memory device;

wherein said takeover information is constituted by associating information for specifying said failover object resources with takeover processing actions set for said failover object resources in accordance with said priority ranking;

wherein said priority ranking includes a first ranking whereby takeover processing is immediately executed and a second ranking whereby takeover processing is executed when an access request for said failover object resources is generated.

2. The failover cluster system according to claim 1 wherein said priority ranking further includes a third ranking whereby takeover processing of said failover object resources is executed if said failover target computer is in a prescribed low-load condition.

3. The failover cluster system according to claim 1 wherein said priority ranking further includes a fourth ranking whereby takeover processing is not executed.

4. The failover cluster system according to claim 1 wherein said failover object resources are filesystems and said priority rankings are respectively set beforehand for each of these filesystems.

5. A failover cluster system comprising a failover source computer, a failover target computer connected with this failover source computer and a shared disk shared by said failover source computer and said failover target computer, wherein, in said failover source computer, there is provided a priority ranking determination processing section that classifies filesystems constituting the failover objects into one of a first category, second category or third category in accordance with the state of use of these respective filesystems and that stores in said shared disk the correspondence relationship of these respective filesystems and said respective categories and, in said failover target computer, there are provided a failover processing section that executes immediate mounting for the filesystems belonging to said first category and an access request acceptance processing section that, if an access request is generated in respect of a filesystem belonging to said second category, executes mounting for the filesystem belonging to said second category but does not execute mounting in respect of a filesystem belonging to said third category irrespective of whether or not there is a request for access.

* * * * *